US010931991B2

(12) United States Patent
Sanghavi

(10) Patent No.: US 10,931,991 B2
(45) Date of Patent: Feb. 23, 2021

(54) METHODS AND SYSTEMS FOR SELECTIVELY SKIPPING THROUGH MEDIA CONTENT

(71) Applicant: Sony Interactive Entertainment LLC, San Mateo, CA (US)

(72) Inventor: Bhumik Sanghavi, Emeryville, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 15/862,516

(22) Filed: Jan. 4, 2018

(65) Prior Publication Data

US 2019/0208283 A1    Jul. 4, 2019

(51) Int. Cl.
*H04N 21/258*    (2011.01)
*H04N 21/472*    (2011.01)
(Continued)

(52) U.S. Cl.
CPC ......... *H04N 21/258* (2013.01); *H04N 21/251* (2013.01); *H04N 21/437* (2013.01);
(Continued)

(58) Field of Classification Search
CPC .......... H04N 21/2225; H04N 21/2407; H04N 21/251; H04N 21/258; H04N 21/431;
(Continued)

(56) References Cited

U.S. PATENT DOCUMENTS 4,521,021 A    6/1985 Dixon
4,542,897 A    9/1985 Melton et al.
(Continued)

FOREIGN PATENT DOCUMENTS

CA    2106122 A1    3/1994
CN    111512635 A    8/2020
(Continued)

OTHER PUBLICATIONS

Price Waterhouse Coopers, "IAB Online Ad Measurement Study," Dec. 2001; 1-52.
(Continued)

*Primary Examiner* — Jeremy S Duffield
(74) *Attorney, Agent, or Firm* — Carr & Ferrell LLP

(57) ABSTRACT

The disclosure provides methods and systems for skipping unwanted portions of media content based on a crowdsourcing feedback model. The media content may include television programming content, video content, and audio content. The unwanted portions of media content include, for example, television commercials, opening and closing credits. An exemplary crowdsourcing feedback model involves receiving and processing a plurality of user seek information records. These records include time markers of the media content indicating when the users started and stopped fast forwarding or when the users started and stopped moving a scrub bar to jump from one portion of the content to another. When collected, the user seek information records are used to train a machine-learning system to calculate start and stop times of unwanted portions of media content. Once the start and stop times are calculated, user devices are enabled to automatically skip these unwanted portions.

17 Claims, 7 Drawing Sheets

(51) Int. Cl.
*H04N 21/431* (2011.01)
*H04N 21/845* (2011.01)
*H04N 21/466* (2011.01)
*H04N 21/6587* (2011.01)
*H04N 21/454* (2011.01)
*H04N 21/442* (2011.01)
*H04N 21/437* (2011.01)
*H04N 21/25* (2011.01)
*H04N 21/8547* (2011.01)

(52) U.S. Cl.
CPC ... *H04N 21/4312* (2013.01); *H04N 21/44222* (2013.01); *H04N 21/454* (2013.01); *H04N 21/466* (2013.01); *H04N 21/47202* (2013.01); *H04N 21/47217* (2013.01); *H04N 21/6587* (2013.01); *H04N 21/845* (2013.01); *H04N 21/8547* (2013.01)

(58) Field of Classification Search
CPC ........... H04N 21/437; H04N 21/44204; H04N 21/44222; H04N 21/4532; H04N 21/454; H04N 21/4667; H04N 21/47217; H04N 21/6582; H04N 21/6587
See application file for complete search history.

(56) References Cited

U.S. PATENT DOCUMENTS

| | | |
|---|---|---|
| 4,734,690 A | 3/1988 | Waller |
| 4,807,158 A | 2/1989 | Blanton et al. |
| 4,905,168 A | 2/1990 | McCarthy et al. |
| 4,926,255 A | 5/1990 | Von Kohorn |
| 4,969,036 A | 11/1990 | Bhanu et al. |
| 5,014,234 A | 5/1991 | Edwards, Jr. |
| 5,083,271 A | 1/1992 | Thacher et al. |
| 5,105,184 A | 4/1992 | Pirani et al. |
| 5,227,874 A | 7/1993 | Von Kohorn |
| 5,231,568 A | 7/1993 | Cohen et al. |
| 5,283,731 A | 2/1994 | Lalonde et al. |
| 5,305,195 A | 4/1994 | Murphy |
| 5,305,389 A | 4/1994 | Palmer |
| 5,319,454 A | 6/1994 | Schutte |
| 5,347,632 A | 9/1994 | Filepp et al. |
| 5,373,440 A | 12/1994 | Cohen |
| 5,377,997 A | 1/1995 | Wilden et al. |
| 5,446,919 A | 8/1995 | Wilkins |
| 5,462,275 A | 10/1995 | Lowe et al. |
| 5,497,479 A | 3/1996 | Hornbuckle |
| 5,512,935 A | 4/1996 | Majeti et al. |
| 5,526,041 A | 6/1996 | Glatt |
| 5,539,450 A | 7/1996 | Handelman |
| 5,548,645 A | 8/1996 | Ananda |
| 5,564,038 A | 10/1996 | Grantz et al. |
| 5,565,909 A | 10/1996 | Thibadeau et al. |
| 5,572,643 A | 11/1996 | Judson |
| 5,592,212 A | 1/1997 | Handelman |
| 5,630,757 A | 5/1997 | Gagin et al. |
| 5,636,346 A | 6/1997 | Saxe |
| 5,663,757 A | 9/1997 | Morales |
| 5,684,526 A | 11/1997 | Yoshinobu |
| 5,697,844 A | 12/1997 | Von Kohorn |
| 5,699,497 A | 12/1997 | Erdahl |
| 5,707,289 A | 1/1998 | Watanabe et al. |
| 5,712,979 A | 1/1998 | Graber et al. |
| 5,721,827 A | 2/1998 | Logan et al. |
| 5,724,521 A | 3/1998 | Dedrick |
| 5,737,619 A | 4/1998 | Judson |
| 5,740,549 A | 4/1998 | Reilly et al. |
| 5,748,867 A | 5/1998 | Cosman et al. |
| 5,751,956 A | 5/1998 | Kirsch |
| 5,758,068 A | 5/1998 | Brandt et al. |
| 5,758,257 A | 5/1998 | Herz et al. |
| 5,771,347 A | 6/1998 | Grantz et al. |
| 5,774,170 A | 6/1998 | Hite et al. |
| 5,794,210 A | 8/1998 | Goldhaber et al. |
| 5,798,519 A | 8/1998 | Vock et al. |
| 5,805,815 A | 9/1998 | Hill |
| 5,822,523 A | 10/1998 | Rothschild et al. |
| 5,848,396 A | 12/1998 | Gerace |
| 5,855,008 A | 12/1998 | Goldhaber et al. |
| 5,857,149 A | 1/1999 | Suzuki |
| 5,860,073 A | 1/1999 | Ferrel et al. |
| 5,867,208 A | 2/1999 | McLaren |
| 5,876,286 A | 3/1999 | Lee |
| 5,879,235 A | 3/1999 | Kaneko et al. |
| 5,903,816 A | 5/1999 | Broadwin et al. |
| 5,910,987 A | 6/1999 | Ginter et al. |
| 5,911,582 A | 6/1999 | Redford |
| 5,916,024 A | 6/1999 | Von Kohorn |
| 5,917,725 A | 6/1999 | Thacher et al. |
| 5,929,850 A | 7/1999 | Broadwin et al. |
| 5,937,037 A | 8/1999 | Kamel et al. |
| 5,946,646 A | 8/1999 | Schena et al. |
| 5,946,664 A | 8/1999 | Ebisawa |
| 5,948,061 A | 9/1999 | Merriman et al. |
| 5,964,660 A | 10/1999 | James et al. |
| 5,970,143 A | 10/1999 | Schneier et al. |
| 5,974,398 A | 10/1999 | Hanson et al. |
| 5,987,511 A | 11/1999 | Elixmann et al. |
| 5,991,735 A | 11/1999 | Gerace |
| 6,005,602 A | 12/1999 | Matthews, III |
| 6,012,984 A | 1/2000 | Roseman |
| 6,015,348 A | 1/2000 | Lambright et al. |
| 6,020,883 A | 2/2000 | Herz et al. |
| 6,024,643 A | 2/2000 | Begis |
| 6,026,368 A | 2/2000 | Brown et al. |
| 6,029,046 A | 2/2000 | Khan et al. |
| 6,036,601 A | 3/2000 | Heckel |
| 6,047,289 A | 4/2000 | Thorne et al. |
| 6,088,722 A | 7/2000 | Herz et al. |
| 6,108,637 A | 8/2000 | Blumenau |
| 6,113,494 A | 9/2000 | Lennert |
| 6,119,098 A | 9/2000 | Guyot et al. |
| 6,149,519 A | 11/2000 | Osaki et al. |
| 6,151,631 A | 11/2000 | Ansell et al. |
| 6,165,070 A | 12/2000 | Nolte et al. |
| 6,179,713 B1 | 1/2001 | James et al. |
| 6,181,988 B1 | 1/2001 | Schneider et al. |
| 6,196,920 B1 | 3/2001 | Spaur et al. |
| 6,199,082 B1 | 3/2001 | Ferrel et al. |
| 6,216,129 B1 | 4/2001 | Eldering |
| 6,236,975 B1 | 5/2001 | Boe et al. |
| 6,238,290 B1 | 5/2001 | Tarr et al. |
| 6,251,017 B1 | 6/2001 | Leason et al. |
| 6,263,360 B1 | 7/2001 | Arnold et al. |
| 6,264,555 B1 | 7/2001 | Glazman et al. |
| 6,264,560 B1 | 7/2001 | Goldberg et al. |
| 6,267,672 B1 | 7/2001 | Vance |
| 6,267,675 B1 | 7/2001 | Lee |
| 6,275,989 B1 | 8/2001 | Broadwin et al. |
| 6,298,348 B1 | 10/2001 | Eldering |
| 6,308,328 B1 | 10/2001 | Bowcutt et al. |
| 6,312,337 B1 | 11/2001 | Edwards et al. |
| 6,320,495 B1 | 11/2001 | Sporgis |
| 6,324,519 B1 | 11/2001 | Eldering et al. |
| 6,343,990 B1 | 2/2002 | Rasmussen et al. |
| 6,346,045 B2 | 2/2002 | Rider et al. |
| 6,366,701 B1 | 4/2002 | Chalom et al. |
| 6,366,947 B1 | 4/2002 | Kavner |
| 6,371,850 B1 | 4/2002 | Sonoda |
| 6,379,251 B1 | 4/2002 | Auxier et al. |
| 6,381,362 B1 | 4/2002 | Deshpande et al. |
| 6,385,592 B1 | 5/2002 | Angles et al. |
| 6,390,922 B1 | 5/2002 | Vange et al. |
| 6,393,574 B1 | 5/2002 | Kashiwagi et al. |
| 6,394,899 B1 | 5/2002 | Walker |
| 6,400,996 B1 | 6/2002 | Hoffberg et al. |
| 6,411,936 B1 | 6/2002 | Sanders |
| 6,434,614 B1 | 8/2002 | Blumenau |
| 6,443,843 B1 | 8/2002 | Walker et al. |
| 6,446,130 B1 | 9/2002 | Grapes |
| 6,446,261 B1 | 9/2002 | Rosser |
| 6,456,234 B1 | 9/2002 | Johnson |

(56) References Cited

U.S. PATENT DOCUMENTS

| | | |
|---|---|---|
| 6,457,010 B1 | 9/2002 | Eldering et al. |
| 6,460,036 B1 | 10/2002 | Herz |
| 6,468,155 B1 | 10/2002 | Zucker et al. |
| 6,470,138 B1 | 10/2002 | Um et al. |
| 6,484,148 B1 | 11/2002 | Boyd |
| 6,484,149 B1 | 11/2002 | Jammes et al. |
| 6,489,955 B1 | 12/2002 | Newhall, Jr. |
| 6,513,160 B2 | 1/2003 | Dureau |
| 6,516,338 B1 | 2/2003 | Landsman et al. |
| 6,529,940 B1 | 3/2003 | Humble |
| 6,530,840 B1 | 3/2003 | Cuomo et al. |
| 6,532,448 B1 | 3/2003 | Higginson et al. |
| 6,539,375 B2 | 3/2003 | Kawasaki |
| 6,539,544 B2 | 3/2003 | Ebisawa |
| 6,553,178 B2 | 4/2003 | Abecassis |
| 6,560,578 B2 | 5/2003 | Eldering |
| 6,563,523 B1 | 5/2003 | Suchocki et al. |
| 6,564,217 B2 | 5/2003 | Bunney et al. |
| 6,595,859 B2 | 7/2003 | Lynn |
| 6,606,746 B1 | 8/2003 | Zdepski |
| 6,611,957 B2 | 8/2003 | Ebisawa |
| 6,612,932 B2 | 9/2003 | Stern |
| 6,615,039 B1 | 9/2003 | Eldering |
| 6,616,533 B1 | 9/2003 | Rashkovskiy |
| 6,625,578 B2 | 9/2003 | Spaur et al. |
| 6,632,138 B1 | 10/2003 | Serizawa et al. |
| 6,640,097 B2 | 10/2003 | Corrigan et al. |
| 6,640,335 B2 | 10/2003 | Ebisawa |
| 6,640,336 B1 | 10/2003 | Ebisawa |
| 6,645,068 B1 | 11/2003 | Kelly et al. |
| 6,654,725 B1 | 11/2003 | Langheinrich et al. |
| 6,656,050 B2 | 12/2003 | Busch et al. |
| 6,659,861 B1 | 12/2003 | Faris et al. |
| 6,663,105 B1 | 12/2003 | Sullivan et al. |
| 6,669,562 B1 | 12/2003 | Shiino |
| 6,669,564 B1 | 12/2003 | Young et al. |
| 6,680,746 B2 | 1/2004 | Kawai et al. |
| 6,683,941 B2 | 1/2004 | Brown et al. |
| 6,684,194 B1 | 1/2004 | Eldering |
| 6,687,608 B2 | 2/2004 | Sugimoto |
| 6,697,792 B2 | 2/2004 | Bunney et al. |
| 6,699,127 B1 | 3/2004 | Lobb et al. |
| 6,701,363 B1 | 3/2004 | Chiu et al. |
| 6,704,930 B1 | 3/2004 | Eldering et al. |
| 6,709,335 B2 | 3/2004 | Bates et al. |
| 6,712,702 B2 | 3/2004 | Goldberg et al. |
| 6,714,236 B1 | 3/2004 | Wada et al. |
| 6,714,723 B2 | 3/2004 | Abecassis |
| 6,714,917 B1 | 3/2004 | Eldering et al. |
| 6,716,103 B1 | 4/2004 | Eck et al. |
| 6,718,551 B1 | 4/2004 | Swix et al. |
| 6,721,748 B1 | 4/2004 | Knight et al. |
| 6,731,238 B2 | 5/2004 | Johnson |
| 6,738,078 B1 | 5/2004 | Duncombe |
| 6,745,011 B1 | 6/2004 | Hendrickson et al. |
| 6,757,740 B1 | 6/2004 | Parekh et al. |
| 6,758,746 B1 | 7/2004 | Hunter et al. |
| 6,758,754 B1 | 7/2004 | Lavanchy et al. |
| 6,758,755 B2 | 7/2004 | Kelly et al. |
| 6,764,395 B1 | 7/2004 | Guyett |
| 6,764,403 B2 | 7/2004 | Gavin |
| 6,771,290 B1 | 8/2004 | Hoyle |
| 6,783,460 B2 | 8/2004 | Galyean, III et al. |
| 6,785,902 B1 | 8/2004 | Zigmond et al. |
| 6,814,663 B2 | 11/2004 | Edwards et al. |
| 6,820,277 B1 | 11/2004 | Eldering et al. |
| 6,827,645 B2 | 12/2004 | Morita et al. |
| 6,840,861 B2 | 1/2005 | Jordan et al. |
| 6,863,612 B2 | 3/2005 | Willis |
| 6,874,683 B2 | 4/2005 | Keronen et al. |
| 6,882,978 B2 | 4/2005 | Ebisawa |
| 6,890,256 B2 | 5/2005 | Walker et al. |
| 6,895,170 B1 | 5/2005 | Lambert et al. |
| 6,912,398 B1 | 6/2005 | Domnitz |
| 6,928,414 B1 | 8/2005 | Kim |
| 6,941,574 B1 | 9/2005 | Broadwin et al. |
| 6,942,575 B2 | 9/2005 | Mergler |
| 6,954,728 B1 | 10/2005 | Kusumoto |
| 6,955,605 B2 | 10/2005 | Young et al. |
| 6,964,608 B1 | 11/2005 | Koza |
| 6,967,566 B2 | 11/2005 | Weston et al. |
| 6,968,567 B1 | 11/2005 | Gordon et al. |
| 6,970,834 B2 | 11/2005 | Martin et al. |
| 6,970,915 B1 | 11/2005 | Partovi et al. |
| 6,973,664 B2 | 12/2005 | Fries |
| 6,995,788 B2 | 2/2006 | James |
| 7,047,302 B1 | 5/2006 | Chatani et al. |
| 7,072,849 B1 | 7/2006 | Filepp et al. |
| 7,085,733 B2 | 8/2006 | Ebisawa |
| 7,086,187 B2 | 8/2006 | Bandak |
| 7,136,871 B2 | 11/2006 | Ozer et al. |
| 7,171,480 B2 | 1/2007 | Chatani |
| 7,305,442 B1 | 12/2007 | Lundy |
| 7,421,454 B2 | 9/2008 | DeShan et al. |
| 7,761,328 B2 | 7/2010 | Kutaragi et al. |
| 7,895,076 B2 | 2/2011 | Kutaragi et al. |
| 8,196,168 B1 * | 6/2012 | Bryan .................. G11B 27/002 725/134 |
| 10,846,779 B2 | 11/2020 | Johnson et al. |
| 10,860,987 B2 | 12/2020 | Cvetkovic et al. |
| 2001/0010757 A1 | 8/2001 | Mori et al. |
| 2001/0011226 A1 | 8/2001 | Greer et al. |
| 2001/0013009 A1 | 8/2001 | Greening et al. |
| 2001/0014915 A1 | 8/2001 | Blumenau |
| 2001/0025245 A1 | 9/2001 | Flickinger et al. |
| 2001/0025254 A1 | 9/2001 | Park |
| 2001/0025274 A1 | 9/2001 | Zehr et al. |
| 2001/0027412 A1 | 10/2001 | Son |
| 2001/0032125 A1 | 10/2001 | Bhan et al. |
| 2001/0032132 A1 | 10/2001 | Moran |
| 2001/0032133 A1 | 10/2001 | Moran |
| 2001/0032137 A1 | 10/2001 | Bennett et al. |
| 2001/0032333 A1 | 10/2001 | Flickinger |
| 2001/0034643 A1 | 10/2001 | Acres |
| 2001/0034762 A1 | 10/2001 | Jacobs et al. |
| 2001/0037232 A1 | 11/2001 | Miller |
| 2001/0039210 A1 | 11/2001 | ST-Denis |
| 2001/0047297 A1 | 11/2001 | Wen |
| 2001/0049620 A1 | 12/2001 | Blasko |
| 2001/0052123 A1 | 12/2001 | Kawai |
| 2002/0004743 A1 | 1/2002 | Kutaragi et al. |
| 2002/0004744 A1 | 1/2002 | Muyres et al. |
| 2002/0007307 A1 | 1/2002 | Miller et al. |
| 2002/0007310 A1 | 1/2002 | Long |
| 2002/0010626 A1 | 1/2002 | Agmoni |
| 2002/0010628 A1 | 1/2002 | Burns |
| 2002/0010757 A1 | 1/2002 | Granik et al. |
| 2002/0013174 A1 | 1/2002 | Murata |
| 2002/0013177 A1 | 1/2002 | Richter |
| 2002/0018076 A1 | 2/2002 | Gianola |
| 2002/0018982 A1 | 2/2002 | Conroy |
| 2002/0019774 A1 | 2/2002 | Kanter |
| 2002/0022476 A1 | 2/2002 | Go |
| 2002/0022516 A1 | 2/2002 | Forden |
| 2002/0023000 A1 | 2/2002 | Bollay |
| 2002/0026345 A1 | 2/2002 | Juels |
| 2002/0026355 A1 | 2/2002 | Mitsuoka et al. |
| 2002/0026638 A1 | 2/2002 | Eldering et al. |
| 2002/0032608 A1 | 3/2002 | Kanter |
| 2002/0032626 A1 | 3/2002 | DeWolf et al. |
| 2002/0032906 A1 | 3/2002 | Grossman |
| 2002/0044687 A1 | 4/2002 | Federman |
| 2002/0046087 A1 | 4/2002 | Hey |
| 2002/0046095 A1 | 4/2002 | Wallace |
| 2002/0046102 A1 | 4/2002 | Dohring et al. |
| 2002/0049968 A1 | 4/2002 | Wilson et al. |
| 2002/0051521 A1 | 5/2002 | Patrick |
| 2002/0055833 A1 | 5/2002 | Sterling |
| 2002/0055876 A1 | 5/2002 | Gabler |
| 2002/0056107 A1 | 5/2002 | Schlack |
| 2002/0059577 A1 | 5/2002 | Lu et al. |
| 2002/0059590 A1 | 5/2002 | Kitsukawa et al. |
| 2002/0059610 A1 | 5/2002 | Ellis |
| 2002/0061778 A1 | 5/2002 | Acres |

(56) References Cited

U.S. PATENT DOCUMENTS

| | | |
|---|---|---|
| 2002/0067730 A1 | 6/2002 | Hinderks |
| 2002/0069405 A1 | 6/2002 | Chapin et al. |
| 2002/0072965 A1 | 6/2002 | Merriman et al. |
| 2002/0072966 A1 | 6/2002 | Eldering et al. |
| 2002/0073235 A1 | 6/2002 | Chen et al. |
| 2002/0077906 A1 | 6/2002 | Remier |
| 2002/0082077 A1 | 6/2002 | Johnson et al. |
| 2002/0082910 A1 | 6/2002 | Kontogouris |
| 2002/0082913 A1 | 6/2002 | Li |
| 2002/0082941 A1 | 6/2002 | Bird |
| 2002/0083435 A1 | 6/2002 | Blasko et al. |
| 2002/0083439 A1 | 6/2002 | Eldering |
| 2002/0083441 A1 | 6/2002 | Flickinger et al. |
| 2002/0083442 A1 | 6/2002 | Eldering |
| 2002/0083443 A1 | 6/2002 | Eldering et al. |
| 2002/0083444 A1 | 6/2002 | Blasko et al. |
| 2002/0083445 A1 | 6/2002 | Flickinger et al. |
| 2002/0083451 A1 | 6/2002 | Gill et al. |
| 2002/0087402 A1 | 7/2002 | Zustak |
| 2002/0087403 A1 | 7/2002 | Meyers et al. |
| 2002/0087973 A1 | 7/2002 | Hamilton et al. |
| 2002/0087975 A1 | 7/2002 | Schlack |
| 2002/0087980 A1 | 7/2002 | Eldering et al. |
| 2002/0094868 A1 | 7/2002 | Tuck et al. |
| 2002/0095676 A1 | 7/2002 | Knee et al. |
| 2002/0098891 A1 | 7/2002 | Graham et al. |
| 2002/0099600 A1 | 7/2002 | Merriman et al. |
| 2002/0099611 A1 | 7/2002 | DeSouza et al. |
| 2002/0099653 A1 | 7/2002 | DeSouza et al. |
| 2002/0100040 A1 | 7/2002 | Bull |
| 2002/0107073 A1 | 8/2002 | Binney |
| 2002/0107075 A1 | 8/2002 | Stephan |
| 2002/0107730 A1 | 8/2002 | Bernstein |
| 2002/0109680 A1 | 8/2002 | Orbanes et al. |
| 2002/0111154 A1 | 8/2002 | Eldering et al. |
| 2002/0111172 A1 | 8/2002 | De Wolf et al. |
| 2002/0111825 A1 | 8/2002 | Martin et al. |
| 2002/0111865 A1 | 8/2002 | Middleton, III et al. |
| 2002/0112035 A1 | 8/2002 | Carey et al. |
| 2002/0112233 A1 | 8/2002 | Cantu Bonilla et al. |
| 2002/0112240 A1 | 8/2002 | Basco et al. |
| 2002/0112249 A1 | 8/2002 | Hendricks et al. |
| 2002/0112250 A1 | 8/2002 | Koplar et al. |
| 2002/0116284 A1 | 8/2002 | Steelman et al. |
| 2002/0120589 A1 | 8/2002 | Aoki |
| 2002/0123928 A1 | 9/2002 | Eldering et al. |
| 2002/0129368 A1 | 9/2002 | Schlack et al. |
| 2002/0133398 A1 | 9/2002 | Geller et al. |
| 2002/0138493 A1 | 9/2002 | Shapiro et al. |
| 2002/0143639 A1 | 10/2002 | Beckett et al. |
| 2002/0143652 A1 | 10/2002 | Beckett |
| 2002/0143901 A1 | 10/2002 | Lupo et al. |
| 2002/0144262 A1 | 10/2002 | Plotnick et al. |
| 2002/0144263 A1 | 10/2002 | Eldering et al. |
| 2002/0147633 A1 | 10/2002 | Rafizadeh |
| 2002/0147638 A1 | 10/2002 | Banerjee et al. |
| 2002/0147645 A1 | 10/2002 | Alao et al. |
| 2002/0152117 A1 | 10/2002 | Cristofalo et al. |
| 2002/0155878 A1 | 10/2002 | Lert, Jr. et al. |
| 2002/0155891 A1 | 10/2002 | Okada et al. |
| 2002/0161625 A1 | 10/2002 | Brito-Valladares et al. |
| 2002/0161639 A1 | 10/2002 | Goldstein |
| 2002/0164977 A1 | 11/2002 | Link, II et al. |
| 2002/0164999 A1 | 11/2002 | Johnson |
| 2002/0165026 A1 | 11/2002 | Perkins et al. |
| 2002/0165764 A1 | 11/2002 | Wade et al. |
| 2002/0173349 A1 | 11/2002 | Ach, III |
| 2002/0173359 A1 | 11/2002 | Gallo et al. |
| 2002/0175936 A1 | 11/2002 | Tenembaum |
| 2002/0178442 A1 | 11/2002 | Williams |
| 2002/0178445 A1 | 11/2002 | Eldering et al. |
| 2002/0178447 A1 | 11/2002 | Plotnick et al. |
| 2002/0184047 A1 | 12/2002 | Plotnick |
| 2002/0184086 A1 | 12/2002 | Linde |
| 2002/0184088 A1 | 12/2002 | Rosenberg |
| 2002/0184130 A1 | 12/2002 | Blasko |
| 2002/0184642 A1 | 12/2002 | Lude et al. |
| 2002/0193066 A1 | 12/2002 | Connelly |
| 2002/0194058 A1 | 12/2002 | Eldering |
| 2002/0194585 A1 | 12/2002 | Connelly |
| 2002/0194590 A1 | 12/2002 | Pong |
| 2002/0194598 A1 | 12/2002 | Connelly |
| 2002/0194607 A1 | 12/2002 | Connelly |
| 2003/0004810 A1 | 1/2003 | Eldering |
| 2003/0009762 A1 | 1/2003 | Hooper et al. |
| 2003/0014307 A1 | 1/2003 | Heng |
| 2003/0014312 A1 | 1/2003 | Fleisher |
| 2003/0014414 A1 | 1/2003 | Newman |
| 2003/0014754 A1 | 1/2003 | Chang |
| 2003/0028433 A1 | 2/2003 | Merriman et al. |
| 2003/0033405 A1 | 2/2003 | Perdon et al. |
| 2003/0035075 A1 | 2/2003 | Butler et al. |
| 2003/0036944 A1 | 2/2003 | Lesandrini et al. |
| 2003/0046148 A1 | 3/2003 | Rizzi |
| 2003/0048293 A1 | 3/2003 | Werkhoven |
| 2003/0054888 A1 | 3/2003 | Walker et al. |
| 2003/0070167 A1 | 4/2003 | Holtz et al. |
| 2003/0073496 A1 | 4/2003 | D'Amico |
| 2003/0074252 A1 | 4/2003 | Chandler-Pepelnjak et al. |
| 2003/0076347 A1 | 4/2003 | Barrett et al. |
| 2003/0079226 A1 | 4/2003 | Barrett |
| 2003/0084449 A1 | 5/2003 | Chane et al. |
| 2003/0084456 A1 | 5/2003 | Ryan et al. |
| 2003/0093311 A1 | 5/2003 | Knowlson |
| 2003/0100375 A1 | 5/2003 | Wakae et al. |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0103644 A1 | 6/2003 | Klayh |
| 2003/0104867 A1 | 6/2003 | Kobayashi et al. |
| 2003/0110171 A1 | 6/2003 | Ozer et al. |
| 2003/0115074 A1 | 6/2003 | Freeman et al. |
| 2003/0115318 A1 | 6/2003 | Wueste |
| 2003/0115587 A1 | 6/2003 | Kendall et al. |
| 2003/0122864 A1 | 7/2003 | Jenne et al. |
| 2003/0126150 A1 | 7/2003 | Chan |
| 2003/0139966 A1 | 7/2003 | Sirota et al. |
| 2003/0144044 A1 | 7/2003 | Piarsky |
| 2003/0144048 A1 | 7/2003 | Silva |
| 2003/0149618 A1 | 8/2003 | Sender et al. |
| 2003/0149623 A1 | 8/2003 | Chen |
| 2003/0158872 A1 | 8/2003 | Adams |
| 2003/0163369 A1 | 8/2003 | Arr |
| 2003/0163482 A1 | 8/2003 | Bunney et al. |
| 2003/0171988 A1 | 9/2003 | Sugihara |
| 2003/0171990 A1 | 9/2003 | Rao et al. |
| 2003/0172005 A1 | 9/2003 | Hellat et al. |
| 2003/0172376 A1 | 9/2003 | Coffin, III |
| 2003/0177490 A1 | 9/2003 | Hoshino et al. |
| 2003/0182567 A1 | 9/2003 | Barton et al. |
| 2003/0182663 A1 | 9/2003 | Gudorf et al. |
| 2003/0187719 A1 | 10/2003 | Brocklebank |
| 2003/0190961 A1 | 10/2003 | Seidman |
| 2003/0191690 A1 | 10/2003 | McIntyre et al. |
| 2003/0195021 A1 | 10/2003 | Yamashita et al. |
| 2003/0195801 A1 | 10/2003 | Takakura et al. |
| 2003/0195837 A1 | 10/2003 | Kostic et al. |
| 2003/0199292 A1 | 10/2003 | Greenberg |
| 2003/0212608 A1 | 11/2003 | Cliff |
| 2003/0216961 A1 | 11/2003 | Barry |
| 2003/0226141 A1 | 12/2003 | Krasnow et al. |
| 2003/0226142 A1 | 12/2003 | Rand |
| 2003/0229893 A1 | 12/2003 | Sgaraglino |
| 2004/0002380 A1 | 1/2004 | Brosnan et al. |
| 2004/0003396 A1 | 1/2004 | Babu |
| 2004/0014454 A1 | 1/2004 | Burgess et al. |
| 2004/0015397 A1 | 1/2004 | Barry et al. |
| 2004/0015608 A1 | 1/2004 | Ellis et al. |
| 2004/0019521 A1 | 1/2004 | Birmingham |
| 2004/0025174 A1 | 2/2004 | Cerrato |
| 2004/0030595 A1 | 2/2004 | Park |
| 2004/0034686 A1 | 2/2004 | Guthrie |
| 2004/0039648 A1 | 2/2004 | Candelore et al. |
| 2004/0039796 A1 | 2/2004 | Watkins |

(56) References Cited

U.S. PATENT DOCUMENTS

| | | |
|---|---|---|
| 2004/0043817 A1 | 3/2004 | Willis |
| 2004/0043819 A1 | 3/2004 | Willis |
| 2004/0044567 A1 | 3/2004 | Willis |
| 2004/0044569 A1 | 3/2004 | Roberts et al. |
| 2004/0044571 A1 | 3/2004 | Bronnimann et al. |
| 2004/0044574 A1 | 3/2004 | Cochran et al. |
| 2004/0054589 A1 | 3/2004 | Nicolas et al. |
| 2004/0059625 A1 | 3/2004 | Schrader |
| 2004/0068552 A1 | 4/2004 | Kotz et al. |
| 2004/0073482 A1 | 4/2004 | Wiggins et al. |
| 2004/0078263 A1 | 4/2004 | Altieri |
| 2004/0078266 A1 | 4/2004 | Kim |
| 2004/0078292 A1 | 4/2004 | Blumenau |
| 2004/0078809 A1 | 4/2004 | Drazin |
| 2004/0083133 A1 | 4/2004 | Nicholas et al. |
| 2004/0102248 A1 | 5/2004 | Young et al. |
| 2004/0103024 A1 | 5/2004 | Patel et al. |
| 2004/0103429 A1 | 5/2004 | Carlucci et al. |
| 2004/0107136 A1 | 6/2004 | Nemirofsky et al. |
| 2004/0110565 A1 | 6/2004 | Levesque |
| 2004/0111317 A1 | 6/2004 | Ebisawa |
| 2004/0111484 A1 | 6/2004 | Young et al. |
| 2004/0116183 A1 | 6/2004 | Prindle |
| 2004/0117272 A1 | 6/2004 | Shehab |
| 2004/0121835 A1 | 6/2004 | Willis et al. |
| 2004/0121842 A1 | 6/2004 | Willis et al. |
| 2004/0126747 A1 | 7/2004 | Fujisawa et al. |
| 2004/0133480 A1 | 7/2004 | Domes |
| 2004/0133518 A1 | 7/2004 | Dryall |
| 2004/0137980 A1 | 7/2004 | Aenlle |
| 2004/0139465 A1 | 7/2004 | Matthews, III et al. |
| 2004/0140352 A1 | 7/2004 | Walker et al. |
| 2004/0143478 A1 | 7/2004 | Ward |
| 2004/0143495 A1 | 7/2004 | Koenig |
| 2004/0148221 A1 | 7/2004 | Chu |
| 2004/0148424 A1 | 7/2004 | Berkson et al. |
| 2004/0148625 A1 | 7/2004 | Eldering et al. |
| 2004/0152517 A1 | 8/2004 | Hardisty et al. |
| 2004/0152518 A1 | 8/2004 | Kogo |
| 2004/0153360 A1 | 8/2004 | Schumann |
| 2004/0153363 A1 | 8/2004 | Stehling |
| 2004/0153385 A1 | 8/2004 | Allibhoy et al. |
| 2004/0153453 A1 | 8/2004 | Brodie et al. |
| 2004/0158858 A1 | 8/2004 | Paxton |
| 2004/0162758 A1 | 8/2004 | Willis |
| 2004/0162759 A1 | 8/2004 | Willis |
| 2004/0163101 A1 | 8/2004 | Swix et al. |
| 2004/0163134 A1 | 8/2004 | Willis |
| 2004/0168202 A1 | 8/2004 | Ebihara |
| 2004/0169678 A1 | 9/2004 | Oliver |
| 2004/0172324 A1 | 9/2004 | Merriman et al. |
| 2004/0172331 A1 | 9/2004 | Merriman et al. |
| 2004/0172332 A1 | 9/2004 | Merriman et al. |
| 2004/0172343 A1 | 9/2004 | Allibhoy et al. |
| 2004/0176170 A1 | 9/2004 | Eck et al. |
| 2004/0176995 A1 | 9/2004 | Fusz |
| 2004/0177001 A1 | 9/2004 | Salinas |
| 2004/0181808 A1 | 9/2004 | Schaefer et al. |
| 2004/0186766 A1 | 9/2004 | Fellenstein et al. |
| 2004/0186771 A1 | 9/2004 | Squires |
| 2004/0193488 A1 | 9/2004 | Khoo et al. |
| 2004/0194123 A1 | 9/2004 | Fredlund et al. |
| 2004/0194128 A1 | 9/2004 | McIntyre et al. |
| 2004/0201629 A1 | 10/2004 | Bates et al. |
| 2004/0204238 A1 | 10/2004 | Aoki |
| 2004/0204247 A1 | 10/2004 | Walker et al. |
| 2004/0205157 A1 | 10/2004 | Bibelnieks et al. |
| 2004/0205508 A1 | 10/2004 | Wecker et al. |
| 2004/0205807 A1 | 10/2004 | Wilcoxson et al. |
| 2004/0210472 A1 | 10/2004 | Lew et al. |
| 2004/0210489 A1 | 10/2004 | Jackson et al. |
| 2004/0210661 A1 | 10/2004 | Thompson |
| 2004/0210824 A1 | 10/2004 | Shoff et al. |
| 2004/0219977 A1 | 11/2004 | Ebisawa |
| 2004/0220850 A1 | 11/2004 | Ferrer et al. |
| 2004/0221018 A1 | 11/2004 | Ji |
| 2004/0224772 A1 | 11/2004 | Canessa et al. |
| 2004/0225562 A1 | 11/2004 | Turner |
| 2004/0225715 A1 | 11/2004 | Gottfried |
| 2004/0230593 A1 | 11/2004 | Rudin et al. |
| 2004/0230994 A1 | 11/2004 | Urdang et al. |
| 2004/0234932 A1 | 11/2004 | Hughes et al. |
| 2004/0236585 A1 | 11/2004 | Kohnke et al. |
| 2004/0243455 A1 | 12/2004 | Smith |
| 2004/0243466 A1 | 12/2004 | Trzybinski et al. |
| 2004/0243470 A1 | 12/2004 | Ozer et al. |
| 2004/0243623 A1 | 12/2004 | Ozer et al. |
| 2004/0248649 A1 | 12/2004 | Arai et al. |
| 2004/0249786 A1 | 12/2004 | Dabney et al. |
| 2004/0252051 A1 | 12/2004 | Johnson |
| 2004/0254831 A1 | 12/2004 | Dean |
| 2004/0254957 A1 | 12/2004 | Hyotyniemi et al. |
| 2004/0255148 A1 | 12/2004 | Monteiro et al. |
| 2004/0259553 A1 | 12/2004 | Delaney et al. |
| 2004/0260609 A1 | 12/2004 | Loeb et al. |
| 2004/0261125 A1 | 12/2004 | Ellis et al. |
| 2004/0266535 A1 | 12/2004 | Reeves |
| 2004/0266537 A1 | 12/2004 | Morris |
| 2004/0267611 A1 | 12/2004 | Hoerenz |
| 2005/0003839 A1 | 1/2005 | Tripp |
| 2005/0005242 A1 | 1/2005 | Hoyle |
| 2005/0015267 A1 | 1/2005 | Barringer et al. |
| 2005/0021387 A1 | 1/2005 | Gottfurcht |
| 2005/0021396 A1 | 1/2005 | Pearch et al. |
| 2005/0021397 A1 | 1/2005 | Cui et al. |
| 2005/0021403 A1 | 1/2005 | Ozer et al. |
| 2005/0021465 A1 | 1/2005 | Segerstrom |
| 2005/0021853 A1 | 1/2005 | Parekh et al. |
| 2005/0027587 A1 | 2/2005 | Latona et al. |
| 2005/0027595 A1 | 2/2005 | Ha et al. |
| 2005/0027699 A1 | 2/2005 | Awadallah et al. |
| 2005/0028188 A1 | 2/2005 | Latona et al. |
| 2005/0028195 A1 | 2/2005 | Feinleib et al. |
| 2005/0032577 A1 | 2/2005 | Blackburn et al. |
| 2005/0033700 A1 | 2/2005 | Vogler et al. |
| 2005/0038698 A1 | 2/2005 | Lukose et al. |
| 2005/0038702 A1 | 2/2005 | Merriman et al. |
| 2005/0050070 A1 | 3/2005 | Sheldon |
| 2005/0055725 A1 | 3/2005 | Stewart |
| 2005/0075155 A1 | 4/2005 | Sitrick |
| 2005/0075172 A1 | 4/2005 | Coleman |
| 2005/0076051 A1 | 4/2005 | Carobus et al. |
| 2005/0091108 A1 | 4/2005 | Frost |
| 2005/0091111 A1 | 4/2005 | Green et al. |
| 2005/0096975 A1 | 5/2005 | Moshe |
| 2005/0096983 A1 | 5/2005 | Werkhoven |
| 2005/0097622 A1 | 5/2005 | Zigmond et al. |
| 2005/0101386 A1 | 5/2005 | Lavanchy et al. |
| 2005/0102177 A1 | 5/2005 | Takayama |
| 2005/0107158 A1 | 5/2005 | Kanisawa et al. |
| 2005/0113170 A1 | 5/2005 | McHugh |
| 2005/0114526 A1 | 5/2005 | Aoyama |
| 2005/0130725 A1 | 6/2005 | Creamer et al. |
| 2005/0143174 A1 | 6/2005 | Goldman et al. |
| 2005/0144063 A1 | 6/2005 | Spector |
| 2005/0144073 A1 | 6/2005 | Morrisroe et al. |
| 2005/0149396 A1 | 7/2005 | Horowitz et al. |
| 2005/0153760 A1 | 7/2005 | Valley |
| 2005/0154640 A1 | 7/2005 | Kolluri et al. |
| 2005/0154717 A1 | 7/2005 | Watson et al. |
| 2005/0155056 A1 | 7/2005 | Knee et al. |
| 2005/0155083 A1 | 7/2005 | Oh et al. |
| 2005/0160442 A1 | 7/2005 | Kaplowitz |
| 2005/0164757 A1 | 7/2005 | Ebisawa |
| 2005/0165640 A1 | 7/2005 | Kotorov |
| 2005/0165644 A1 | 7/2005 | Beyda et al. |
| 2005/0171865 A1 | 8/2005 | Beardow |
| 2005/0177413 A1 | 8/2005 | Blumberg et al. |
| 2005/0177430 A1 | 8/2005 | Willis |
| 2005/0177431 A1 | 8/2005 | Willis et al. |
| 2005/0177461 A1 | 8/2005 | Rosefelt et al. |
| 2005/0178940 A1 | 8/2005 | Granick |
| 2005/0179685 A1 | 8/2005 | Kake et al. |
| 2005/0182693 A1 | 8/2005 | Alivandi |

(56) References Cited

U.S. PATENT DOCUMENTS

| | | |
|---|---|---|
| 2005/0182737 A1 | 8/2005 | Brown |
| 2005/0185825 A1 | 8/2005 | Hoshino et al. |
| 2005/0192071 A1 | 9/2005 | Matsuno et al. |
| 2005/0192864 A1 | 9/2005 | Ganz |
| 2005/0193411 A1 | 9/2005 | Funston |
| 2005/0193425 A1 | 9/2005 | Sull et al. |
| 2005/0195157 A1 | 9/2005 | Kramer et al. |
| 2005/0203804 A1 | 9/2005 | Suzuki et al. |
| 2005/0203811 A1 | 9/2005 | David |
| 2005/0204381 A1 | 9/2005 | Ludvig et al. |
| 2005/0215310 A1 | 9/2005 | Boyd et al. |
| 2005/0216346 A1 | 9/2005 | Kusumoto et al. |
| 2005/0216348 A1 | 9/2005 | Martin et al. |
| 2005/0216581 A1 | 9/2005 | Blumenau et al. |
| 2005/0222908 A1 | 10/2005 | Kltberg et al. |
| 2005/0227749 A1 | 10/2005 | Bender et al. |
| 2005/0228797 A1 | 10/2005 | Koningstein et al. |
| 2005/0235030 A1 | 10/2005 | Lauckhart et al. |
| 2005/0235199 A1 | 10/2005 | Adams |
| 2005/0235310 A1 | 10/2005 | Bies |
| 2005/0235318 A1 | 10/2005 | Grauch et al. |
| 2005/0240476 A1 | 10/2005 | Bigott |
| 2005/0246736 A1 | 11/2005 | Beyda et al. |
| 2005/0247769 A1 | 11/2005 | Potter et al. |
| 2005/0251539 A1 | 11/2005 | Parekh et al. |
| 2005/0256768 A1 | 11/2005 | Robinson |
| 2005/0261062 A1 | 11/2005 | Lewin et al. |
| 2005/0261962 A1 | 11/2005 | Chuah |
| 2005/0266906 A1 | 12/2005 | Stevens |
| 2005/0266907 A1 | 12/2005 | Weston et al. |
| 2005/0270537 A1 | 12/2005 | Mian et al. |
| 2005/0283395 A1 | 12/2005 | Lesandrini et al. |
| 2005/0283401 A1 | 12/2005 | Swix et al. |
| 2005/0288999 A1 | 12/2005 | Lemer et al. |
| 2006/0085517 A1 | 4/2006 | Kaurila |
| 2006/0167747 A1 | 7/2006 | Goodman |
| 2006/0179453 A1 | 8/2006 | Kadie et al. |
| 2006/0212350 A1 | 9/2006 | Ellis et al. |
| 2006/0230141 A1 | 10/2006 | Willis |
| 2006/0245504 A1* | 11/2006 | Ogikubo ............ G11B 27/105 375/240.25 |
| 2006/0248209 A1 | 11/2006 | Chiu |
| 2006/0253323 A1 | 11/2006 | Phan et al. |
| 2006/0265503 A1 | 11/2006 | Jones et al. |
| 2006/0268667 A1 | 11/2006 | Jellison, Jr. et al. |
| 2007/0027760 A1 | 2/2007 | Collins et al. |
| 2007/0027771 A1 | 2/2007 | Collins et al. |
| 2007/0027852 A1 | 2/2007 | Howard et al. |
| 2007/0038931 A1 | 2/2007 | Allaire et al. |
| 2007/0043616 A1 | 2/2007 | Kutaragi |
| 2007/0050254 A1 | 3/2007 | Driscoll |
| 2007/0073756 A1 | 3/2007 | Manhas et al. |
| 2007/0078714 A1 | 4/2007 | Ott |
| 2007/0083611 A1 | 4/2007 | Farago et al. |
| 2007/0124134 A1 | 5/2007 | Van Kommer |
| 2007/0130594 A1 | 6/2007 | Hidary et al. |
| 2007/0146812 A1 | 6/2007 | Lawton |
| 2007/0174471 A1 | 7/2007 | Van Rossom |
| 2007/0244760 A1 | 10/2007 | Bodnar et al. |
| 2008/0016188 A1 | 1/2008 | Batni et al. |
| 2008/0097872 A1 | 4/2008 | Peckover |
| 2008/0152300 A1* | 6/2008 | Knee ................ H04N 21/4312 386/250 |
| 2008/0206732 A1 | 8/2008 | Zalewski |
| 2008/0250334 A1 | 10/2008 | Price |
| 2008/0288460 A1 | 11/2008 | Poniatowski et al. |
| 2009/0037253 A1 | 2/2009 | Davidow et al. |
| 2009/0183081 A1 | 7/2009 | Rodriguez |
| 2010/0063866 A1 | 3/2010 | Kinoshita et al. |
| 2010/0287070 A1 | 11/2010 | Santeufemia et al. |
| 2010/0306061 A1 | 12/2010 | Wagner |
| 2010/0333137 A1 | 12/2010 | Hamano et al. |
| 2011/0173054 A1 | 7/2011 | Kutaragi et al. |
| 2011/0231873 A1 | 9/2011 | Toebes et al. |
| 2011/0289183 A1 | 11/2011 | Rollins |
| 2012/0066059 A1 | 3/2012 | Berger |
| 2012/0102431 A1 | 4/2012 | Krolczyk et al. |
| 2012/0102573 A1 | 4/2012 | Spooner et al. |
| 2012/0123865 A1 | 5/2012 | Salzano |
| 2013/0110980 A1* | 5/2013 | Benn ................. H04N 21/2387 709/219 |
| 2014/0058766 A1 | 2/2014 | Yu et al. |
| 2014/0122203 A1 | 5/2014 | Johnson et al. |
| 2015/0058873 A1 | 2/2015 | Newell et al. |
| 2015/0332232 A1 | 11/2015 | Wright |
| 2016/0044090 A1 | 2/2016 | Glickfield et al. |
| 2016/0117754 A1 | 4/2016 | DeStefano et al. |
| 2016/0180447 A1 | 6/2016 | Kamalie et al. |
| 2016/0248865 A1 | 8/2016 | Dotan-Cohen et al. |
| 2016/0253631 A1 | 9/2016 | Jones et al. |
| 2017/0289619 A1* | 10/2017 | Xu ..................... H04N 21/2181 |
| 2018/0098101 A1* | 4/2018 | Pont .................. H04N 21/2387 |
| 2018/0098119 A1* | 4/2018 | Overcash ......... H04N 21/44222 |
| 2018/0108054 A1 | 4/2018 | Doubinski et al. |
| 2018/0144392 A1 | 5/2018 | Johnson et al. |
| 2018/0174110 A1 | 6/2018 | Cvetkovic et al. |

FOREIGN PATENT DOCUMENTS

| | | |
|---|---|---|
| EP | 0337539 A2 | 10/1989 |
| EP | 0405776 A2 | 1/1991 |
| EP | 0620688 A2 | 10/1994 |
| EP | 0625760 A1 | 11/1994 |
| EP | 0743595 A2 | 5/1996 |
| GB | 2141907 A | 1/1985 |
| GB | 2194369 A | 3/1988 |
| JP | H01220925 A | 9/1989 |
| JP | H06335569 A | 12/1994 |
| JP | H08117445 A | 5/1996 |
| JP | H08173634 A | 7/1996 |
| JP | H08280934 A | 10/1996 |
| JP | 2001321556 A | 11/2001 |
| JP | 2002366971 A | 12/2002 |
| JP | 2003248844 A | 9/2003 |
| JP | 2004298469 A | 10/2004 |
| JP | 2008527476 A | 7/2008 |
| JP | 2010176321 A | 12/2010 |
| WO | WO1993014462 A2 | 7/1993 |
| WO | WO1993019427 A1 | 9/1993 |
| WO | WO1993022017 A1 | 11/1993 |
| WO | WO1993023125 A1 | 11/1993 |
| WO | WO1995012442 A1 | 5/1995 |
| WO | WO1995012853 A1 | 5/1995 |
| WO | WO1999059097 A1 | 11/1999 |
| WO | WO2003032127 A2 | 4/2003 |
| WO | WO2005086969 A2 | 9/2005 |
| WO | WO2018118268 A1 | 6/2018 |
| WO | WO2019135826 A1 | 7/2019 |

OTHER PUBLICATIONS

Nielsen Media Research, "What TV Ratings Really Mean (and Other Frequently-Asked Questions)." Jun. 2005, 7 pages.

Business Wire, "RTIME Announces First 100-Person Twitch Game for Internet; "RTIME Rocks!" Demonstrates the Power of RTIME Interactive Networking Engine to Support Large Scale, High Performance, Internet Game Play." Look Smart: Find Articles: Apr. 14, 1997, 3 pages.

Business Wire, "Juno Launches America's First Free Internet E-mail Service; Initial Advertisers Include Lands' End, Miramax and Snapple", Apr. 19, 1996, 4 pages.

"International Search Report" and "Written Opinion of the International Searching Authority", Patent Cooperation Treaty Application No. PCT/US2017/061276, dated Jan. 18, 2018, 13 pages.

"International Search Report" and "Written Opinion of the International Searching Authority", Patent Cooperation Treaty Application No. PCT/US2018/058677, dated Dec. 17, 2018, 12 pages.

Unknown, "Software: Yahoo Widgets Engine," Sep. 6, 2006 [retrieved on May 23, 2019], Retrieved from the Internet: <URL:https://www.windowstipoftheday.blogspot.com/2006/09/software-yahoo-widgets-engine.html>, 3 pages.

(56) References Cited

OTHER PUBLICATIONS

"Extended European Search Report", European Application No. 17883956.9, dated Jun. 12, 2020, 9 pages.
"Office Action", Japan Patent Application No. 2019-532735, dated Sep. 1, 2020, 3 pages [7 pages with translation].

* cited by examiner

METHODS AND SYSTEMS FOR SELECTIVELY SKIPPING THROUGH MEDIA CONTENT

TECHNICAL FIELD

This disclosure generally relates to media processing and, more particularly, to methods and systems for selectively skipping through media content.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

With the advent of Digital Video Recorder (DVR) and Video on Demand (VOD) services, media content became available to television viewers to watch at any time. These services became a popular way to watch television programming content, such as television shows, news, videos, and movies, for millions of people. Conventionally, television programming content broadcasted by providers includes numerous television commercials or other parts of video content, such opening credits, that can be deemed undesirable by some viewers. Many television viewers would prefer not to watch television commercials, especially when the television commercials interrupt the media content the television viewer is watching.

Existing ad skipping technology has a few shortcomings. First, traditional ad skipping technology requires consumer electronic devices or backend services to analyze the media stream and find reference points within the content to understand when a commercial starts and ends. This process can become increasingly difficult, especially when the content has multiple television commercials, while content differentiators remain the same. In addition, the traditional ad skipping technology is vulnerable to scaling. Yet scaling may pose digital rights management (DRM) issues.

Some conventional ad skipping methods are based on identifying a silent frame, increase in audio levels, a black frame, content markers, or other features to predict the beginning and end of television commercials. Such methods are often inefficient, especially when the content includes news or sports programming where the format of commercials can differ from conventional ad formats. In addition, the conventional methods are not scalable to low power devices that do not have sufficient processing bandwidth. Many client devices are unable to perform complex content processing to identify television commercial breaks, either because of software or hardware restrictions. Current server-side solutions have similar issues. Moreover, the conventional ad skipping technology is unable to skip other unwanted portions of content, such as opening and closing credits, introductory videos, and the like.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to methods and systems for skipping unwanted portions of media content provided to users by DVR, catch-up television, or VOD services based on a crowdsourcing feedback model. The media content can include television programming content, video content, audio content, movies, television shows, television news, and the like. The unwanted portions of media content that can be skipped with this technology include, for example, television commercials, advertisements, opening credits, closing credits, title sequences, introductory videos, closing videos, and so forth. The crowdsourcing feedback model can involve receiving and processing a plurality of user seek information records. These records include time markers of the media content indicating when the users have started and stopped fast forwarding or when the users have started and stopped moving a "scrub" bar to jump from one portion of the content to another. When collected, the user seek information records can be used to train a machine-learning (ML) system (or heuristic system) to calculate start and stop times of various unwanted portions of media content. According to various embodiments, once the start and stop times of unwanted portions of media content are determined, the user devices are enabled to automatically skip these unwanted portions for the benefit of users.

According to one aspect of the present disclosure, provided is a method for skipping one or more unwanted portions of a media content. An example method can include providing the media content to a plurality of users, enabling each of the users, individually, to control playing of the media content on a user device, obtaining a plurality of user seek information records associated with the playing of the media content from the plurality of users (each of the user seek information records including a first seek time marker and a second seek time marker), determining a start time and a stop time of at least one unwanted portion of the media content based on a plurality of the first seek time markers and a plurality of the second seek time markers, and providing a control widget of a graphical user interface for a user device of a selected user when the media content is played for the selected user. When the control widget is activated by the selected user, the at least one unwanted portion of the media content is skipped from the start time to the stop time.

In further embodiments, the method steps are stored on a machine-readable medium, comprising instructions, which when implemented by one or more processors perform the steps. In yet further example embodiments, hardware systems or devices can be adapted to perform the recited steps. Other features, examples, and embodiments are described below.

BRIEF DESCRIPTION OF THE DRAWINGS

Embodiments are illustrated by way of example, and not by limitation in the figures of the accompanying drawings, in which like references indicate similar elements.

DETAILED DESCRIPTION

Figure 1A:
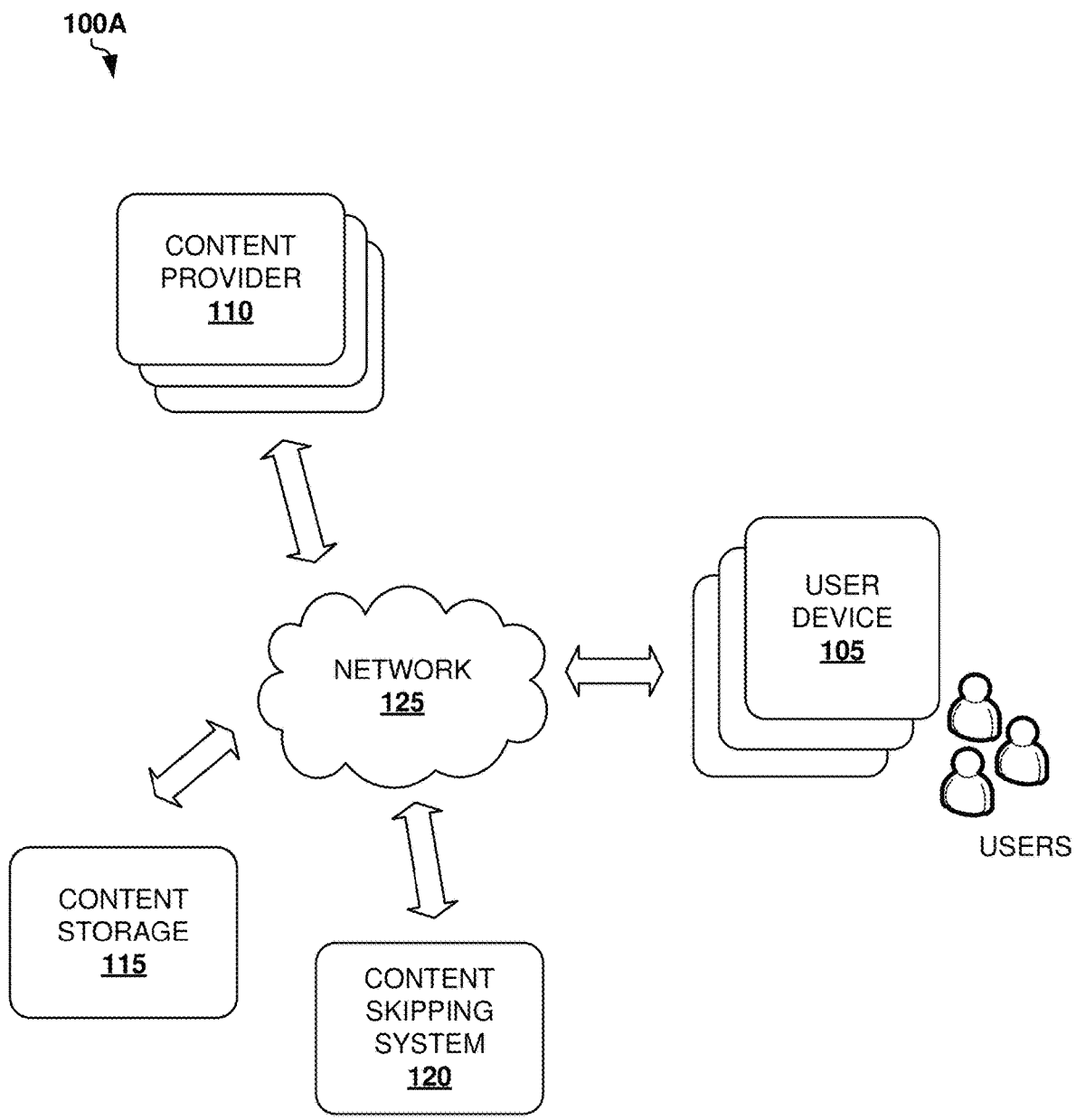
FIG. 1A shows an example system architecture for implementing methods and systems for skipping unwanted portions of media content, according to one example embodiment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents.

The present disclosure is directed to methods and systems for skipping unwanted portions of media content when the media content is presented to users. The term "media content" or simply "content" shall be construed to include any video, audio, gaming, or multimedia content. Some examples of the media content include television programming content, movies, television shows, television news, video clips, music, podcasts, audio books, computer games, and so forth. The term "unwanted portions of media content" shall be construed to include advertisements, including television advertisements and television commercials, as well as opening credits, closing credits, title sequences, introductions, introductory videos and the like. The media content can be pre-recorded and delivered to the users with various content delivery technologies such as DVR, catch-up television service, VOD service, or from a cloud-based or computer storage system, to name a few. The term "user" shall be construed to include an individual that consumes the media content presented to the user through a user device. The terms "user," "viewer," "consumer," and "customer" can be used interchangeably. The term "user device" shall be construed to include an electronic consumer device capable of presenting the media content to one or more users. Some examples of user devices include a mobile device, a smart phone, a cellular phone, a computer (e.g., a laptop computer, a desktop computer, a tablet computer, a netbook, a workstation, a home automation computer, and an in-vehicle computer), a television device, a display, a projector, a home cinema system, a multimedia system, an audio system, a game console, a gaming device, a television receiver, a cable modem, a set-top box, and the like.

As users are typically the best judges of the desirability of for the media content being served, the present technology for skipping unwanted portions of media content is based on a crowdsourcing feedback model. The crowdsourcing feedback model can collect certain records indicating user seek behavior and process this information with a heuristic, statistical, or machine-learning system. Particularly, the model can track when the users decided to move from one part of media content to another using, for example, a fast-forward feature, rewind feature, moving a seek bar or scrub bar, or any other method for manually skipping certain parts of the media content. Each user can seek information record that is collected from the user devices can include at least a first seek time marker and a second seek time marker that represent media content that was manually skipped. Each user seek information record can be associated with a particular media content. For example, the user seek information records can be uniquely indexed with a media asset identifier (ID).

When aggregated, two or more seek time markers from multiple users, start and stop times of unwanted portions of media content can be calculated by the heuristic, statistical, or machine-learning systems. The more seek time markers collected for a particular media content, the more accurately the start and stop times of unwanted portions can be calculated. In some embodiments, previews (i.e., thumbnail seek) can improve the user seek information records because the users are able to more accurately skip unwanted portions of the content.

Furthermore, the start and stop times can be used to automatically skip the unwanted portions when the media content is provided to the users. In other words, user devices can be enabled to move from one part of a media content to another one based on the start and stop times in order to skip the unwanted portions based on the crowdsourced feedback. As the machine-learning (ML) system is trained based on the user seek information records, the start and stop times of unwanted portions can be determined more and more accurately.

Multiple variables can be used by the machine-learning system to identify precise start and stop times of unwanted portions. Variables may include a range in time from one-time marker to the next one. This approach can allow the technology to provide intelligent assumptions based on rules, such as "credits are typically less than 45 seconds long" or "an ad block typically is greater than 2 minutes."

As media content may include more than one unwanted portion of media content, the present technology can be capable of identifying start and stop times for all of those unwanted portions. It is relevant to distinguish how quickly a second user's content skip operation (e.g., fast forwarding or moving a scrub bar) is performed after a first user's content skip operation. If the second content skip operation is performed by the user substantially immediately after the first user's content skip operation, it can be presumed that these two operations are effectively one skip operation. When the skip operations stand apart in time, there is a presumption that there are two separate unwanted portions of media content that the user wanted to skip. As such, the present technology can record the duration of time since the last user seek. For example, if a minute has passed since the last seek, the system can determine that the current seek is a new seek for a new time marker. On the other hand, if only one or a few seconds have passed, the current user seek is likely a correction based on the previous seek for the same marker. Different variables for the machine-learning system may be associated with different weights.

Moreover, in some embodiments, the machine-learning system adds more data points to make its decision-making process more efficient. These data points can be associated with channel networks, types of TV shows, past machine learning, and so forth. For example, the machine-learning system can analyze how long commercials run for a specific show or specific network. News and sports programming may have erratic pattern which can train the machine-learning system to improve predictions.

In yet additional embodiments, the present technology can use the machine-learning system to identify start and stop times of unwanted portions of content in conjunction with video feed based markers. The video feed based markers are typically hidden markers or meta-data like markers provided with the content. In this scenario, the machine-learning system can be used to refine the timing of video feed based markers.

The present crowdsourcing feedback model for skipping unwanted content can be broken down into a data collection step (e.g., collecting user seek information records from two or more users), a refinement step (e.g., determining start and stop times of unwanted portions of media content by the machine-learning system), and obtaining feedback (e.g., collecting new user seek information records). This feedback loop can enable increasing the efficiency of the machine-learning system. The system can determine whether the user has taken advantage of the "skip ahead" feature and subsequently corrected time markers. In this scenario, the subsequent user seek information can be given a much greater weight, because this information is a direct user input for correcting the timing of the current start and stop times.

When the start and stop times are determined, user devices may provide users with an option to enable skipping of the unwanted portions. For example, a graphical user interface (GUI) of user devices may include a control widget (e.g., a soft button) to allow the users to skip unwanted portions of media content with just one click. The control widget can be shown dynamically on the user's device GUI to allow the users to skip the content when needed.

The present technology can be applied to more than skipping unwanted media content. For example, the system can generate a heat map of where people started watching certain media content, re-watched the content, or skipped some unwanted media content to watch the content they like. The heat map can be used in media content analysis or for billing purposes. In yet other embodiments, the present technology allows understanding and creating a highlight show-reel for the media content.

The following detailed description of embodiments includes references to the accompanying drawings, which form a part of the detailed description. Note, the features, structures, or characteristics of embodiments described herein may be combined in any suitable manner. In the instant description, numerous specific details are provided, such as examples of programming, software modules, user selections, network transactions, hardware modules, hardware circuits, hardware chips, and so forth, to provide a thorough understanding of embodiments. One skilled in the relevant art will recognize, however, that the embodiments can be practiced without one or more of the specific details, or with other methods, components, materials, and so forth. In other instances, well-known structures, materials, or operations are not shown or described in detail to avoid obscuring aspects of the disclosure.

Embodiments of this disclosure will now be presented with reference to accompanying drawings which show blocks, components, circuits, steps, operations, processes, algorithms, and the like. These elements may be implemented using electronic hardware, computer software, or any combination thereof. Whether such elements are implemented as hardware or software depends upon the particular application and design constraints imposed on the overall system. The electronic hardware includes one or more processors such as microprocessors, microcontrollers, Central Processing Units (CPUs), digital signal processors (DSPs), field programmable gate arrays (FPGAs), programmable logic devices (PLDs), state machines, gated logic, discrete hardware circuits, and other suitable hardware configured to perform various functions described throughout this disclosure. The processors may execute software, firmware, or middleware (collectively referred to as "software"). The term "software" shall be construed broadly to mean processor-executable instructions, instruction sets, code segments, program code, programs, subprograms, software components, applications, software applications, software packages, routines, subroutines, objects, executables, threads of execution, procedures, functions, and the like, whether referred to as software, firmware, middleware, microcode, hardware description language, or otherwise. If the functions described herein are implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage, solid state memory, or any other data storage devices, combinations of the aforementioned types of computer-readable media, or any other medium that can be used to store computer executable code in the form of instructions or data structures that can be accessed by a computer.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." The term "or" is used to refer to a nonexclusive "or," such that "A or B" includes "A but not B," "B but not A," and "A and B," unless otherwise indicated.

Referring now to the drawings, example embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1A shows an example system architecture 100A for implementing methods and systems for skipping unwanted portions of media content. System architecture 100A includes one or more user devices 105 for use by a plurality of users. Some examples of user devices 105 include television devices, displays, computers, cable modems, television receivers, set-top boxes, or any combination thereof. User devices 105 are configured to present media content provided by one or more content providers 110. Content providers 110 can include television providers, media services, video services, and so forth. Within system architecture 100, content providers 110 can be implemented as one or more servers. As such, in a simple embodiment, content provider 110 is a television provider that broadcasts television programming to user devices 105 for watching by the users. User devices 105 include a user interface, such as a graphical user interface (GUI), enabling the user to control playing the media content delivered from the content provider 110. For example, the GUI may enable the users to start, pause, and stop playing the media content, and rewind or fast-forward the media content. For example, the GUI can include a seek bar or scrub bar enabling the users to jump from one part of the media content to another part by dragging or otherwise moving the seek or scrub bar. The GUI may also enable the users to perform other operations such as making user inputs, searching for media content, requesting media content, sharing media content, and so forth.

Still referring to FIG. 1A, system architecture 100A includes content storage 115 for recording or temporarily storing media content provided by content providers 110 for one or more users. In one example, content storage 115 is a DVR. In another example, content storage 115 is a catch-up service or VOD service. Accordingly, it should be understood that content storage 115 can be a part of user device 105 or a part of content provider 110 depending on a particular implementation.

System architecture 100A also includes a content skipping system 120, which can be implemented as a stand-alone server, virtual server, service, or be a part of or integrated with any of content provider 110, content storage 115, or user device 105. In various embodiments, content skipping system 120 is designed to implement one or more steps of a method for skipping unwanted portions of media content as disclosed herein. Particularly, content skipping system 120 may include a heuristic, statistical, or machine-learning system for collecting and processing user seek information. In various embodiments content skipping system 120 is also configured to determine start and stop times of unwanted portions of media content (e.g., television commercials or opening credits) based on a result of processing the user seek information. The start and stop times can then be used by the content skipping system 120 to enable user devices 105 to automatically skip the unwanted portions of media content. As the user seek information is a form of a feedback aggregated from the plurality of users, in various embodiments, the unwanted portions of media content are determined by crowdsourced efforts for each particular piece of media content. Moreover, each additional user seek information record collected from one or more users may be used to train the machine-learning system of content skipping system 120. This can allow the system to determine the start and stop times more accurately for the benefit of all users.

The aforementioned elements of system architecture 100A are operatively connected to one another via one or more communications networks 125 as shown in FIG. 1A. Communications networks 125 can be of any wires or wireless (radio or optical) communication means. For example, communications networks 125 include television cable networks, cellular networks, the Internet, Ethernet-based networks, satellite networks, and so forth.

Figure 1B:
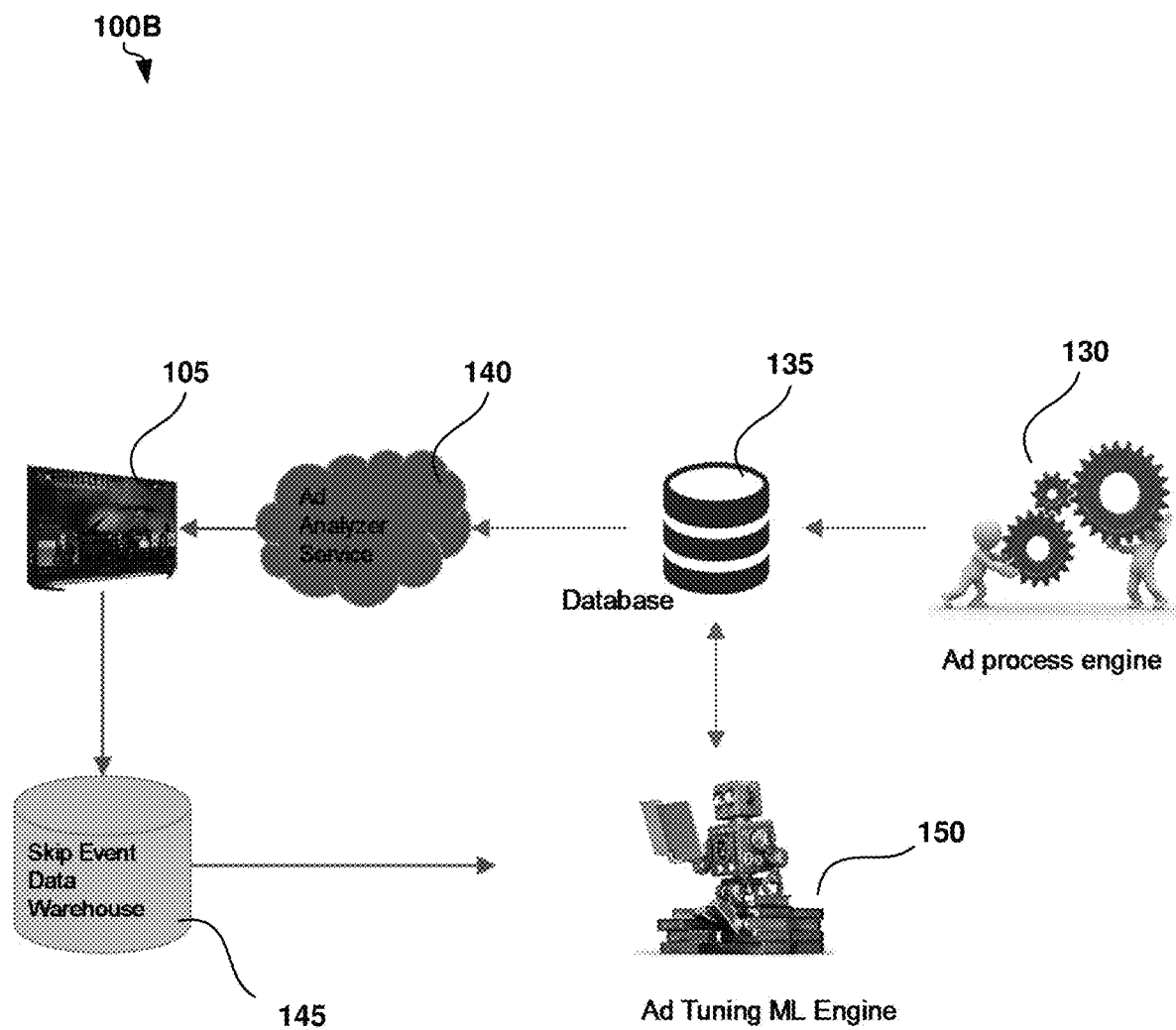
FIG. 1B shows another example system architecture for implementing methods and systems for skipping unwanted portions of media content, according to another example embodiment.

FIG. 1B shows an example system architecture 100B for implementing methods and systems for skipping unwanted portions of media content. System architecture 100B is shown to illustrate certain high-level components of content skipping system 120.

As shown in FIG. 1B, a user device 105, such as a smart TV can be operatively connected to various backend services. The various backend services include an ad processing engine 130 that provides commercials, a database 135 for storing data associated with commercials, an ad analyzer service 140 for tracking and analyzing content and commercials, a skip event data warehouse (database) 145 for storing individual start and stop markers associated with commercials, and an ad tuning machine-learning engine 150 for applying a machine-learning model to content and commercial related data to identify or refine start and stop times of commercials. In some embodiments, ad analyzer service 140 can include a DVR or refer to a part of content storage 115.

Note, database 135, ad analyzer service 140, skip event data warehouse 145, and ad tuning machine-learning engine 150 can, collectively, constitute content skipping system 120 (or content skipping system 120 and content storage 115).

Figure 2:
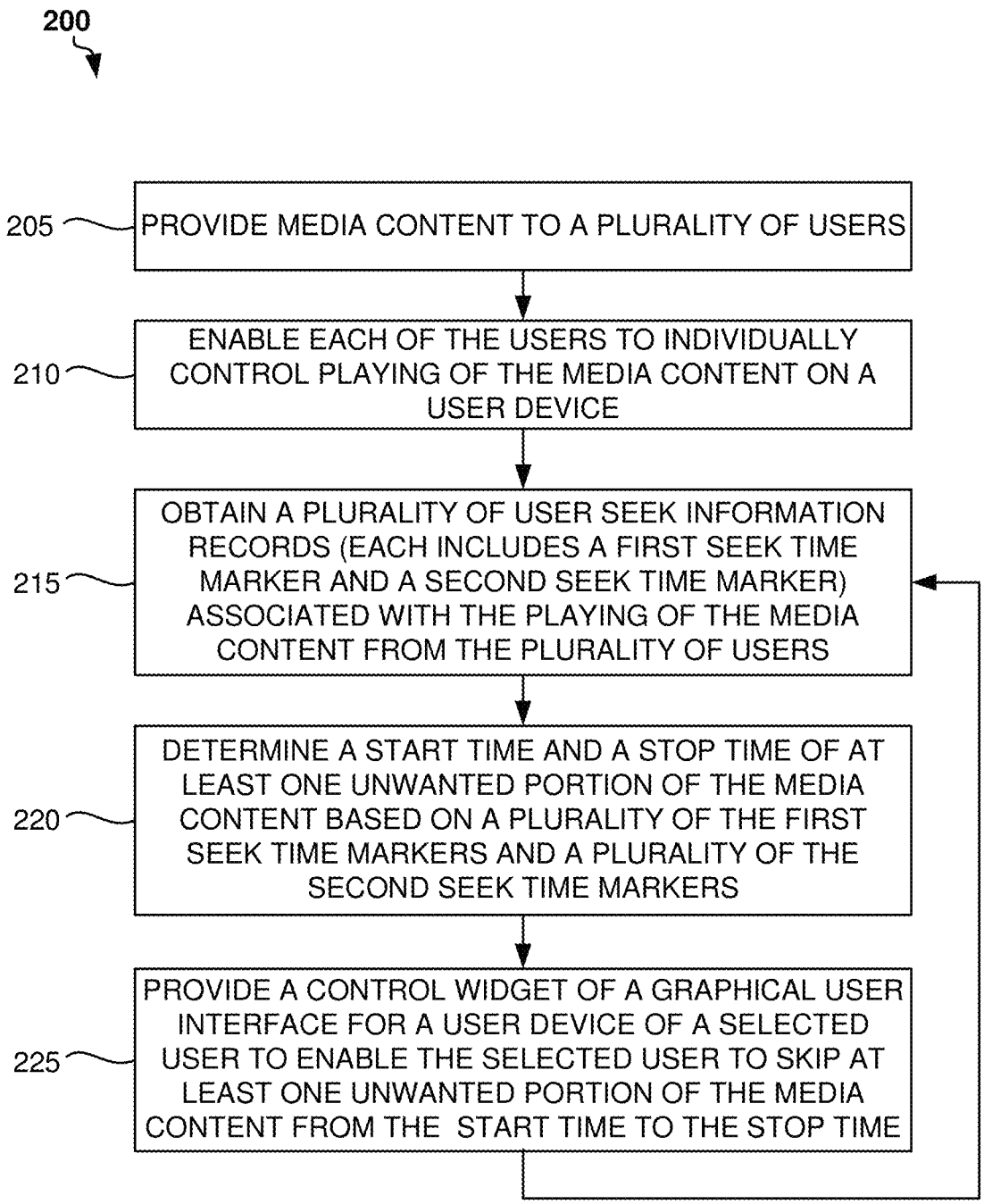
FIG. 2 shows an example process flow diagram showing a method for skipping unwanted portions of media content, according to an example embodiment.

FIG. 2 shows an example process flow diagram showing a method 200 for skipping unwanted portions of media content, according to an example embodiment. Method 200 can be performed by processing logic that includes hardware (e.g., decision-making logic, dedicated logic, programmable logic, application-specific integrated circuit), software (such as software run on a general-purpose computer system or a dedicated machine), or a combination of both. In one example embodiment, the processing logic refers to one or more elements of content skipping system 120 shown in FIG. 1.

Operations of method 200 recited below can be implemented in an order different than described and shown in the figure. Moreover, method 200 may have additional operations not shown herein, but which can be evident to those skilled in the art from the disclosure. Method 200 may also have fewer operations than shown in FIG. 2 and described below.

At operation 205, a media content is provided to a plurality of users. The media content can be provided by content storage 115 (e.g., DVR system or VOD system). As explained above, the media content may include television programming content or video content with one or more unwanted portions, such as commercial breaks or opening credits. As such, the media content can be streamed to the user devices from the DVR or VOD system.

At operation 210, content storage 115 or user devices 105 enable each of the users to individually control playing of the media content on user devices 105. For example, the users can operate control elements of a GUI provided by user devices 105 to search, request, and play certain media content. The users can also rewind, fast forward, or jump from one part of the media content to another part using a scrub bar. When the users rewind, fast forward, or operate the scrub bar, user devices 105 seek information records associated with the media content. Each of the user seek information records includes a first seek time marker and a second seek time marker that represent time instances of the media content manually skipped by the users.

Figure 4:
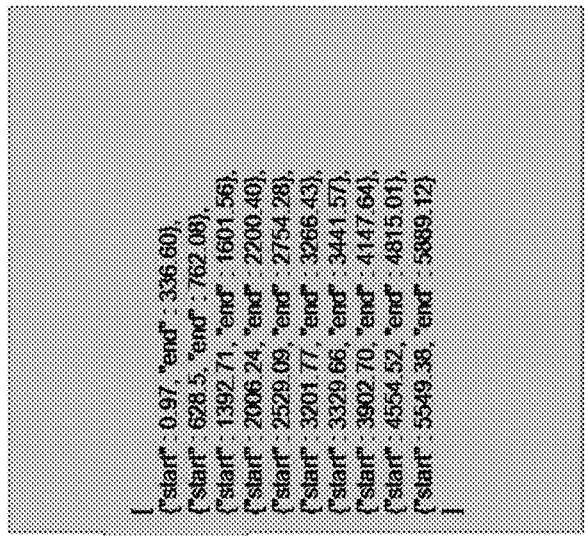
FIG. 4 shows an example data record of start and stop (end) times associated with commercials present in a plurality of content items.

At operation 215, content skipping system 120 obtains a plurality of user seek information records associated with the playing of the same media content from the plurality of users. For example, the user seek information records can be stored in a database of the content skipping system 120. Each user seek information record can have a unique ID and be associated with an ID of media content. When the collection of information records associated with the same media content is obtained from the plurality of users, the user seek information records include a plurality of the first seek time markers and a plurality of the second seek time markers. FIG. 4 shows an example snippet 400 of user seek information records stored as JavaScript Object Notation (JSON) objects. As shown in FIG. 4, for each content item, such as a movie or TV show, there can be one or more records associated therewith to indicate user seek start (first) and stop (second) time markers.

Depending on a particular application, the first and second seek times may be defined differently. In one embodiment, the first seek time marker indicates a time of a media content when one of the users started moving the scrub bar of the GUI to jump from one part of the media content to another part of the media content, while the second seek time marker indicates a time of a media content when the user stopped moving the scrub bar of the graphical user interface to jump from one part of the media content to another part of the media content. In another embodiment, the first seek time marker indicates a time when one of the users initiated fast forwarding of the media content, while the second seek time marker indicates a time when the user stopped fast forwarding the media content.

Figure 5A:
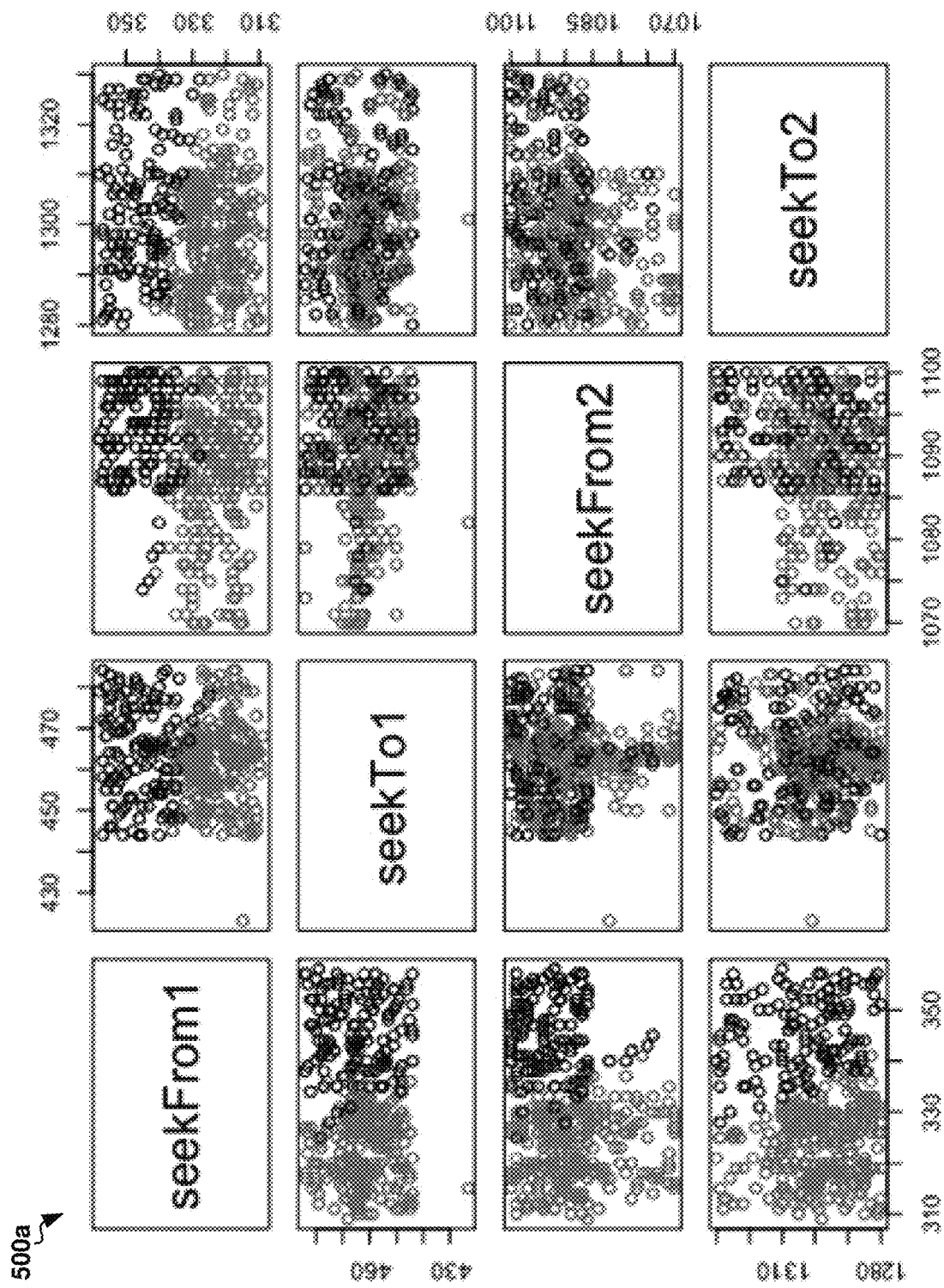
FIGS. 5A-5B show example graphical representations of machine-learning system distribution data records of start and stop times associated with various commercials or content items in accordance with certain embodiments.
Figure 5B:
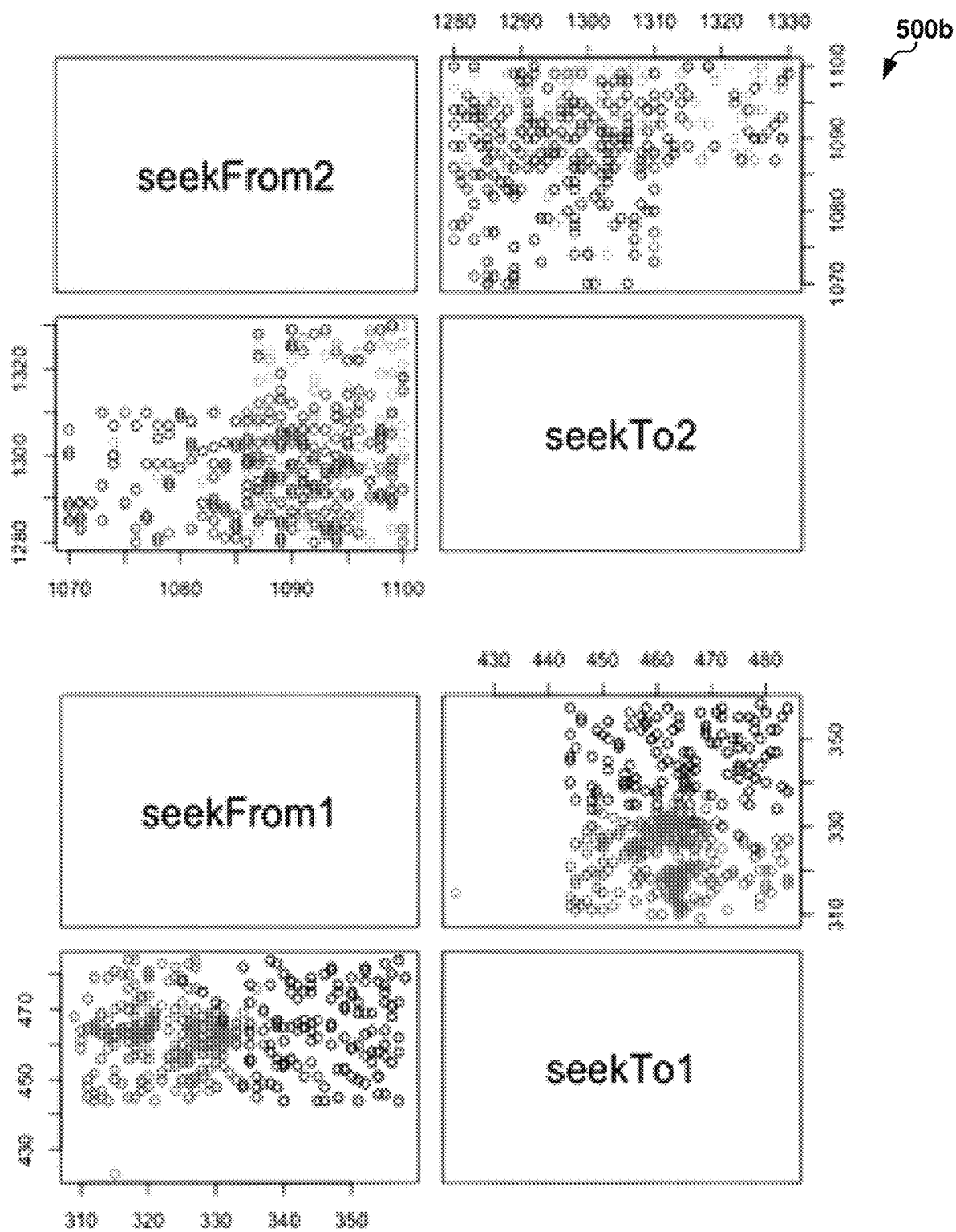

At operation 220, content skipping system 120 determines a start time and a stop time of at least one unwanted portion of the media content based on the plurality of the first seek time markers and the plurality of the second seek time markers. Content skipping system 120 can determine a single timing range for each unwanted portion of media content. The determination of the start time and the stop time of the unwanted portion is made using the machine-learning system. It is also important that the machine-learning system is trained for each media content based on the plurality of user seek information records. The training is based on the user seek information records obtained from two or more users. FIGS. 5A-5B show example graphical representations 500a and 500b, respectively, of machine-learning system distribution records for determining start times and the stop times of unwanted content portions.

At operation 225, content skipping system 120 provides a control widget of a GUI for user device 105 of a selected user when the media content is played for the selected user. Moreover, when the control widget is activated by the selected user, the unwanted portion of the media content is skipped from the start time and up to the stop time, which are determined at operation 225. The method may further proceed back to operation 215 to repeat the operations 215 through 225 for the same or other selected users. Notably, the selected user is one of the plurality of users.

In additional embodiments, the plurality of user can seek information records associated with the same media content can also include a third seek time marker and a fourth seek time marker. Both the third seek time marker and the fourth seek time marker are created after the second seek time marker. The third seek time marker and the fourth seek time marker, collectively, indicate another (second) unwanted portion of media content manually identified by one or more users. Respectively, the operations 215 through 225 are performed for the third seek time marker and the fourth seek time marker so as to precisely determine the start and stop times of the second unwanted portion of media content so as to enable the users or user devices 105 to automatically skip it.

In these embodiments, method 200 may also include the operations of calculating a period between the third seek time marker and the second seek marker and determining whether the period between the third seek time marker and the second seek marker is less than a predetermined value. If the period between the third seek time marker and the second seek marker is less than the predetermined value, content storage 115 or content skipping system 120 disables media content skipping for the media content between the third seek time marker and the fourth seek marker. Alternatively, if the period between the third seek time marker and the second seek marker is more than the predetermined value, content skipping system 120 determines (by the machine-learning system) a second start time and a second stop time of a second unwanted portion of the media content based on the third seek time marker and the fourth seek time marker such that the media content between the third seek time marker and the fourth seek marker can be skipped by the users.

Figure 3:
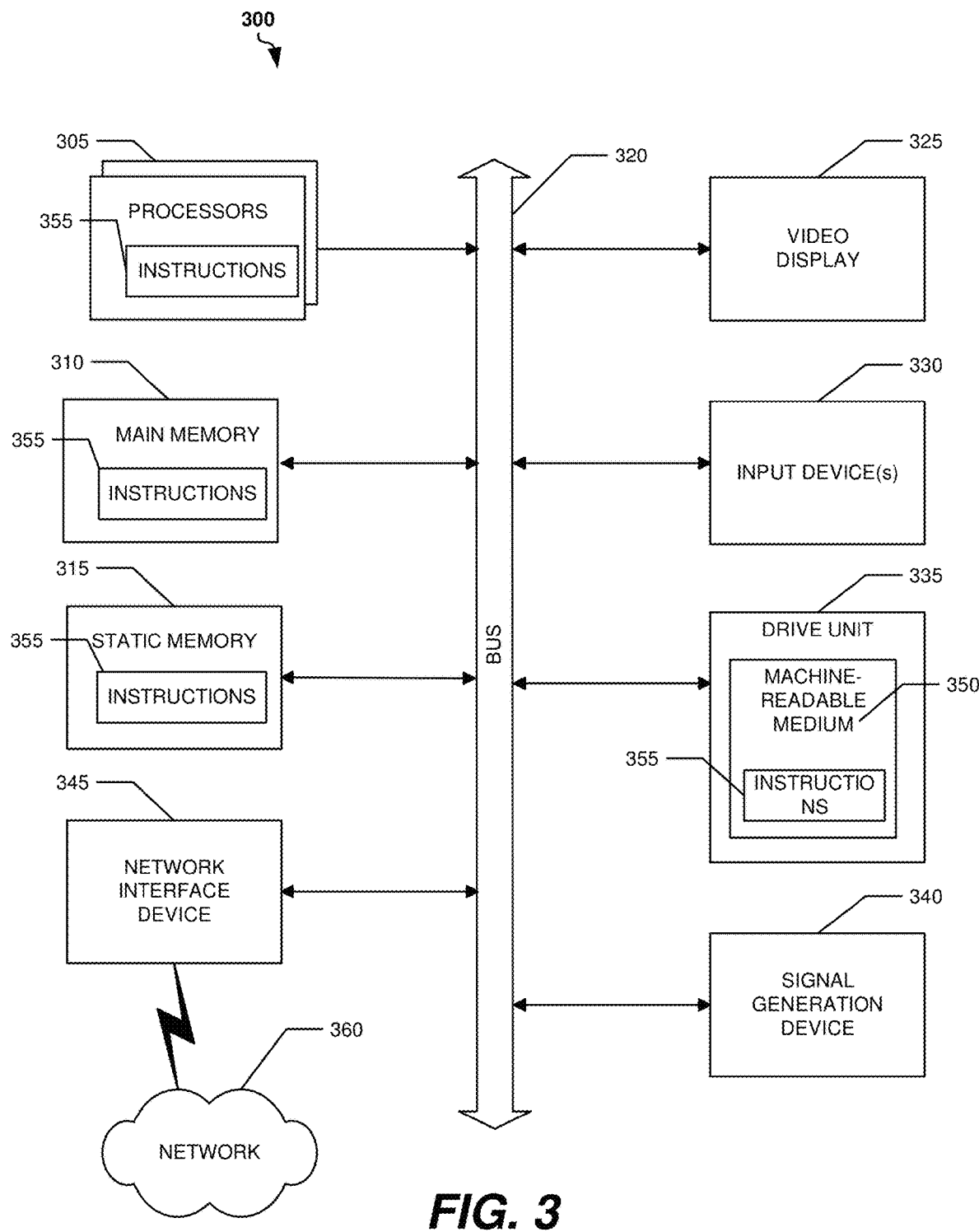
FIG. 3 is a diagrammatic representation of an example machine in the form of a computer system within which a set of instructions for the machine to perform any one or more of the methodologies discussed herein is executed.

FIG. 3 shows a diagrammatic representation of a computing device for a machine in an example electronic form of a computer system 300, within which a set of instructions for causing the machine to perform any one or more of the methods discussed herein can be executed. In example embodiments, the machine operates as a standalone device, or it can be operatively connected or networked to other machines. In a networked deployment, the machine can operate in the capacity of a server, a client machine in a server-client network environment, or as a peer machine in a peer-to-peer (or distributed) network environment. The machine can be a personal computer (PC), tablet PC, laptop PC, desktop PC, server, television device, display, cable modem, set-top box, multimedia system, game console, gaming device, cellular telephone, smart phone, web appliance, network router, switch, or any machine capable of executing a set of instructions that specify actions to be taken by that machine. As such, machine shown in FIG. 3 can represent hardware implementation of user device 105, content skipping system 120, and content storage 115. Further, while only a single machine is illustrated, the term "machine" shall also be taken to include any collection of machines that separately or jointly execute a set (or multiple sets) of instructions to perform any one or more of the methodologies discussed herein.

The example computer system 300 includes a processor or multiple processors 305 (e.g., a central processing units (CPU), a graphics processing unit (GPU), or both), a main memory 310, and a static memory 315, which communicate with each other via a bus 320. Computer system 300 can further include a video display 325 (e.g., a LCD, projector). Computer system 300 also includes at least one input device 330, such as an alphanumeric input device (e.g., a keyboard, keypad, remote control, graphical user interface, etc.), a cursor control device (e.g., a mouse), a microphone, a digital camera, a video camera, and so forth. Computer system 300 also includes a disk drive unit 335, a signal generation device 340 (e.g., a speaker), and a network interface device 345.

Drive unit 335 (also referred to as the disk drive unit 335) includes a machine-readable medium 350 (also referred to as a computer-readable medium 350), which stores one or more sets of instructions and data structures (e.g., instructions 355) embodying or utilized by any one or more of the methodologies or functions described herein. Instructions 355 can also reside, completely or at least partially, within the main memory 310 and/or the processors 305 during execution thereof by computer system 300. Main memory 310 and processors 305 also constitute machine-readable media.

Instructions 355 can further be transmitted or received over a communications network 360 via network interface device 345 utilizing one or more transfer protocols (e.g., Hyper Text Transfer Protocol (HTTP), Serial, and Modbus). Communications network 360 includes the Internet, television network, local intranet, Personal Area Network (PAN), Local Area Network (LAN), Wide Area Network (WAN), Metropolitan Area Network (MAN), virtual private network (VPN), storage area network (SAN), frame relay connection, Advanced Intelligent Network (AIN) connection, synchronous optical network (SONET) connection, Digital Data Service (DDS) connection, Digital Subscriber Line (DSL) connection, Ethernet connection, Integrated Services Digital Network (ISDN) line, cable modem, Asynchronous Transfer Mode (ATM) connection, or a Fiber Distributed Data Interface (FDDI) or Copper Distributed Data Interface (CDDI) connection. Furthermore, communications also includes links to any of a variety of wireless networks including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), cellular digital packet data (CDPD), Research in Motion, Limited (RIM) duplex paging network, Bluetooth radio, or an IEEE 802.11-based radio frequency network.

While machine-readable medium 350 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, RAM, ROM, and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, XML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C#, .NET, Adobe Flash, Perl, UNIX Shell, Visual Basic or Visual Basic Script, Virtual Reality Markup Language (VRML), ColdFusion™ or other compilers, assemblers, interpreters, or other computer languages or platforms.

Thus, the methods and systems for skipping unwanted portions of media content are disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for skipping one or more unwanted portions of a media content, the method comprising:
providing a media content to a plurality of users;
enabling each of the users, individually, to control playing of the media content on a user device;
obtaining a plurality of user seek information records associated with the playing of the media content from the plurality of users, wherein each of the user seek information records includes a first seek time marker, a second seek time marker, a third seek time marker, and a fourth seek time marker, the first, second, third, and fourth seek time markers being created successively in time, wherein the first seek time marker and the second seek time marker define a first portion of the media content and the third seek time marker and the fourth seek time marker define a second portion of the media content;
calculating, for at least one of the user seek information records, a period between the third seek time marker and the second seek time marker, wherein the calculated period between the third seek time marker and the second seek time marker is less than a predetermined value;
after the calculating, correcting the second seek time marker with the fourth seek time marker, wherein the first seek time marker and the corrected second seek time marker define a third portion of the media content, the third portion of the media content including the first portion of the media content and the second portion of the media content;
determining a start time and a stop time of a first unwanted portion of the media content based on a plurality of the first seek time markers and a plurality of the second seek time markers;
providing a control widget of a graphical user interface for a user device of a selected user when the media content is played for the selected user, wherein when the control widget is activated by the selected user, the first unwanted portion of the media content is skipped from the start time and up to the stop time;
while the media content is being played, receiving, from one or more of the plurality of users, feedback responsive to the skipping of the first unwanted portion of the media content, the feedback including a further plurality of user seek information records, wherein each of the further plurality of user seek information records includes a further first seek time marker and a further second seek time marker;
based on the further first seek time marker and the further second seek time marker, adjusting the start time and the stop time of the first unwanted portion of the media content; wherein the first seek time marker indicates a time of media content when one of the users started dragging a scrub bar of the graphical user interface to jump from one part of the media content to another part of the media content; and
wherein the second seek time marker indicates a time of media content when the user stopped dragging the scrub bar of the graphical user interface to jump from one part of the media content to another part of the media content.

2. The method of claim 1, wherein the selected user is one of the plurality of users.

3. The method of claim 1, wherein the first unwanted portion of the media content includes an advertisement or commercial.

4. The method of claim 1, wherein the first unwanted portion of the media content includes a title sequence, opening credits, or closing credits of the media content.

5. The method of claim 1, wherein the determination of the start time and the stop time of the first unwanted portion of the media content is made using a machine-learning system.

6. The method of claim 5, wherein the machine-learning system is trained for each media content based on the plurality of user seek information records.

7. The method of claim 1, wherein the first seek time marker indicates a time when one of the users initiated fast forwarding of the media content; and
wherein the second seek time marker indicates a time when the user stopped fast forwarding the media content.

8. The method of claim 1, wherein the providing of the media content comprises streaming the media content to the user devices from a digital video recorder (DVR).

9. The method of claim 1, wherein the providing of the media content comprises streaming the media content to the user devices from a video-on-demand (VOD) service or a catch-up video service.

10. The method of claim 1, further comprising:
calculating, for at least one of the user seek information records, another period between a fifth seek time marker and the fourth seek time marker, wherein the calculated period between the fifth seek time marker and the fourth seek time marker is more than a predetermined value;
determining by a machine-learning system another start time and another stop time of another unwanted portion of the media content based on the fifth seek time marker and a sixth seek time marker such that the media content between the fifth seek time marker and the sixth seek marker can be skipped by the plurality of users.

11. A system for skipping one or more unwanted portions of a media content, the system comprising at least one processor and a memory storing processor-executable codes, wherein the at least one processor is configured to implement the following operations upon executing the processor-executable codes:
provide a media content to a plurality of users;
enable each of the users to individually control playing of the media content on a user device;
obtain a plurality of user seek information records associated with the playing of the media content from the plurality of users, wherein each of the user seek information records includes a first seek time marker, a second seek time marker, a third seek time marker, and a fourth seek time marker, the first, second, third, and fourth seek time markers being created successively in time, wherein the first seek time marker and the second seek time marker define a first portion of the media content and the third seek time marker and the fourth seek time marker define a second portion of the media content;
calculate, for at least one of the user seek information records, a period between the third seek time marker and the second seek time marker, wherein the calculated period between the third seek time marker and the second seek time marker is less than a predetermined value;
after the calculating, correct the second seek time marker with a fourth seek time marker, wherein the first seek time marker and the corrected second seek time marker define a third portion of the media content, the third portion of the media content including the first portion of the media content and the second portion of the media content;
determine a start time and a stop time of a first unwanted portion of the media content based on a plurality of the first seek time markers and a plurality of the second seek time markers;
provide a control widget of a graphical user interface for a user device of a selected user when the media content is played for the selected user, wherein when the control widget is activated by the selected user, the first unwanted portion of the media content is skipped from the start time and up to the stop time;
while the media content is played, receive, from one or more of the plurality of users, feedback responsive to the skipping of the first unwanted portion of the media content, the feedback including a further plurality of user seek information records, wherein each of the further plurality of user seek information records includes a further first seek time marker and a further second seek time marker;
based on the further first seek time marker and the further second seek time marker, adjust the start time and the stop time of the first unwanted portion of the media content;
wherein the first seek time marker indicates a time of media content when one of the users started dragging a scrub bar of the graphical user interface to jump from one part of the media content to another part of the media content; and
wherein the second seek time marker indicates a time of media content when the user stopped dragging the scrub bar of the graphical user interface to jump from one part of the media content to another part of the media content.

12. The system of claim 11, further comprising a machine-learning system for the determining the start time and the stop time of the first unwanted portion of the media content.

13. The system of claim 12, wherein the machine-learning system is trained for each media content based on the plurality of user seek information records.

14. The system of claim 11, wherein the first seek time marker indicates a time when one of the users initiated fast forwarding of the media content; and
wherein the second seek time marker indicates a time when the user stopped fast forwarding the media content.

15. The system of claim 11, wherein the providing of the media content comprises streaming the media content to the user devices from a DVR.

16. The system of claim 11, wherein the providing of the media content comprises streaming the media content to the user devices from a VOD service or a catch-up video service.

17. A non-transitory processor-readable medium having instructions stored thereon, which when executed by one or more processors, cause the one or more processors to implement a method for skipping one or more unwanted portions of a media content, the method comprising:
providing a media content to a plurality of users;
enabling each of the users to individually control playing of the media content on a user device;
obtaining a plurality of user seek information records associated with the playing of the media content from the plurality of users, wherein each of the user seek information records includes a first seek time marker, a second seek time marker, a third seek time marker, and a fourth seek time marker, the first, second, third, and fourth seek time markers being created successively in time, wherein the first seek time marker and the second seek time marker define a first portion of the media content and the third seek time marker and the fourth seek time marker define a second portion of the media content;

calculating, for at least one of the user seek information records, a period between the third seek time marker and the second seek time marker, wherein the calculated period between the third seek time marker and the second seek time marker is less than a predetermined value;

after the calculating, correcting the second seek time marker with the fourth seek time marker, wherein the first seek time marker and the corrected second seek time marker define a third portion of the media content, the third portion of the media content including the first portion of the media content and the second portion of the media content;

determining a start time and a stop time of a first unwanted portion of the media content based on a plurality of the first seek time markers and a plurality of the second seek time markers;

providing a control widget of a graphical user interface for a user device of a selected user when the media content is played for the selected user, wherein when the control widget is activated by the selected user, the first unwanted portion of the media content is skipped from the start time and up to the stop time;

while the media content is played, receiving, from one or more of the plurality of users, feedback responsive to the skipping of the first unwanted portion of the media content, the feedback including a further plurality of user seek information records, wherein each of the further plurality of user seek information records includes a further first seek time marker and a further second seek time marker;

based on the further first seek time marker and the further second seek time marker, adjusting the start time and the stop time of the first unwanted portion of the media content;

wherein the first seek time marker indicates a time of media content when one of the users started dragging a scrub bar of the graphical user interface to jump from one part of the media content to another part of the media content; and wherein the second seek time marker indicates a time of media content when the user stopped dragging the scrub bar of the graphical user interface to jump from one part of the media content to another part of the media content.

\* \* \* \* \*